(12) United States Patent
Cofar et al.

(10) Patent No.: US 12,544,197 B2
(45) Date of Patent: Feb. 10, 2026

(54) COMPUTER IMPLEMENTED METHODS FOR DEFINING A DENTAL RESTORATION

(71) Applicant: SMILECLOUD SRL, Timisoara (RO)

(72) Inventors: Florin-Nicolae Cofar, Dumbravita (RO); Eric Van Dooren, Wilrijk (BE); Mihai Simonia, Timisoara (RO); Cristian Diaconescu, Timisoara (RO); Radu-Florin Sarghe, Timisoara (RO); Cristian-Florin Marta, Timisoara (RO)

(73) Assignee: SMILECLOUD SRL, Timisoara (RO)

( * ) Notice: Subject to any disclaimer, the term of this patent is extended or adjusted under 35 U.S.C. 154(b) by 1105 days.

(21) Appl. No.: 17/428,355

(22) PCT Filed: Feb. 3, 2020

(86) PCT No.: PCT/EP2020/052638
§ 371 (c)(1),
(2) Date: Aug. 4, 2021

(87) PCT Pub. No.: WO2020/161082
PCT Pub. Date: Aug. 13, 2020

(65) Prior Publication Data
US 2022/0117708 A1    Apr. 21, 2022

(30) Foreign Application Priority Data

Feb. 6, 2019 (EP) .................. 19155845

(51) Int. Cl.
*A61C 9/00* (2006.01)
*A61C 13/00* (2006.01)
*G06F 30/00* (2020.01)

(52) U.S. Cl.
CPC ........... *A61C 9/0053* (2013.01); *A61C 9/004* (2013.01); *A61C 13/0004* (2013.01); *G06F 30/00* (2020.01)

(58) Field of Classification Search
CPC ... A61C 9/0053; A61C 9/004; A61C 13/0004; G06F 30/00; G06F 30/10; G06F 30/12; G06F 2111/00–2119/22; G16H 50/50
See application file for complete search history.

(56) References Cited

U.S. PATENT DOCUMENTS

| | | | |
|---|---|---|---|
| 2009/0148816 A1 | 6/2009 | Marshall et al. | |
| 2010/0145898 A1* | 6/2010 | Malfliet | G06V 20/20 703/1 |

(Continued)

FOREIGN PATENT DOCUMENTS

| | | | | |
|---|---|---|---|---|
| EP | 3639787 A1 * | 4/2020 | ............. | A61B 34/30 |
| JP | 4614517 B2 * | 1/2011 | | |
| WO | WO-2016054744 A1 * | 4/2016 | ............... | A61B 1/24 |

OTHER PUBLICATIONS

Sesemann "Appropriate Line Angles to Optimize Smile Design Restorations", Journal of Cosmetic Dentistry Fall 2017 vol. 33 No. 3 (Year: 2017).*

(Continued)

*Primary Examiner* — Rehana Perveen
*Assistant Examiner* — Troy A Maust
(74) *Attorney, Agent, or Firm* — KDW Firm PLLC

(57) ABSTRACT

A computer implemented method (1000) of characterising a tooth by analysing at least one digital representation of said tooth in its clinical environment, comprising: a) determining a parameter indicative for the position of the tooth in a mouth; b) determining a limited set of parameters for describing the tooth in a clinical environment, comprising parameters indicative of a size and shape of the tooth, and parameters for describing adjacent papilla's. Computer implemented method (1100) for adding teeth to a database. Computer implemented method (1200) for determining a matching score between teeth. Computer implemented method (1300) of searching a database to find matching (Continued)

teeth. Computer implemented method for allowing a user to design or define a dental restoration, and producing a 3D file for producing the dental restoration. Computer program product for any of these computer implemented methods. A digital database.

15 Claims, 17 Drawing Sheets

(56) References Cited

U.S. PATENT DOCUMENTS

| | | | |
|---|---|---|---|
| 2013/0060532 A1* | 3/2013 | Clausen | A61C 13/08 703/1 |
| 2013/0108988 A1 | 5/2013 | Simoncic | |
| 2013/0282351 A1 | 10/2013 | Tank | |
| 2015/0056576 A1* | 2/2015 | Nikolskiy | A61C 9/004 433/214 |
| 2015/0111177 A1* | 4/2015 | Fisker | A61C 9/004 433/199.1 |
| 2017/0319293 A1* | 11/2017 | Fisker | A61C 9/0053 |
| 2018/0204332 A1* | 7/2018 | Salah | G06V 10/7515 |
| 2018/0263732 A1* | 9/2018 | Pokotilov | A61C 9/0053 |
| 2023/0390031 A1* | 12/2023 | Marshall | G16H 50/70 |

OTHER PUBLICATIONS

International Search Report, issued Apr. 15, 2020, pertaining to PCT/EP2020/052638, filed Feb. 3, 2020, 3 pages.
Written Opinion, issued Apr. 15, 2020, pertaining to PCT/EP2020/052638, filed Feb. 3, 2020, 8 pages.

* cited by examiner (a)            (b)

(a)
(b)
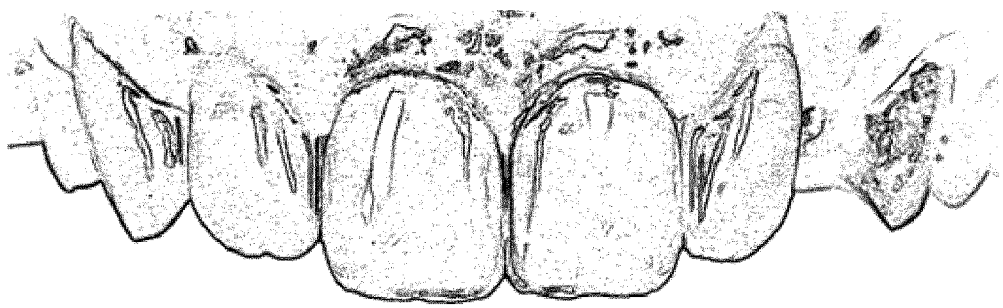
FIG 2
(a)
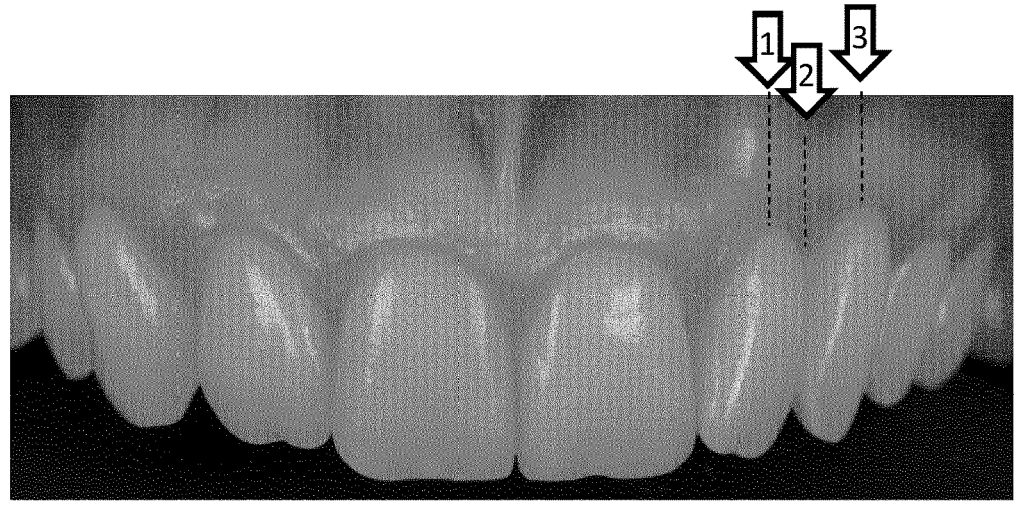
(b)
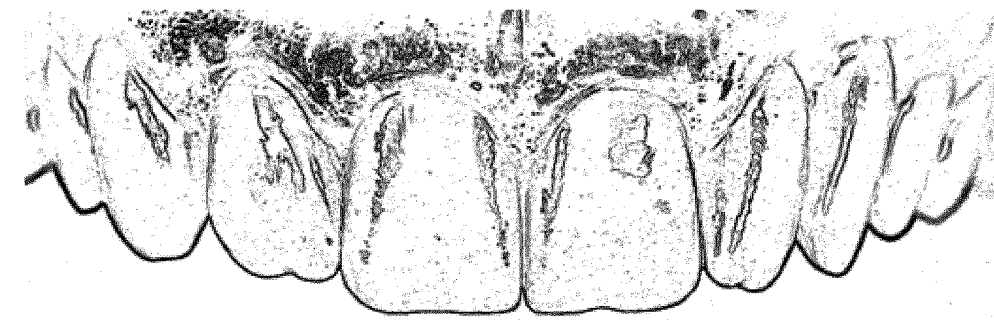
FIG 3

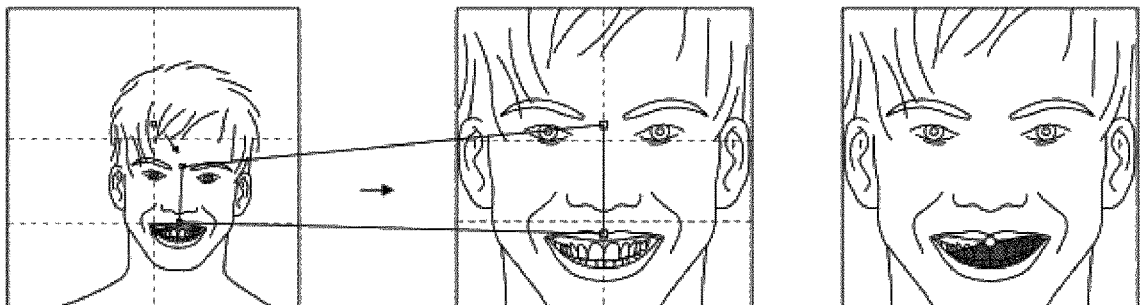
(a) Straighten face    (b)    (c) Inner lip contour
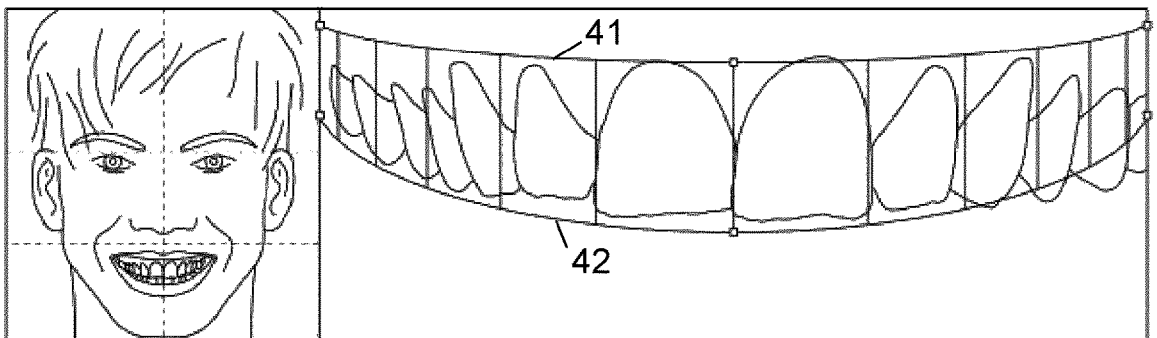
(d)    (e) Restorative space
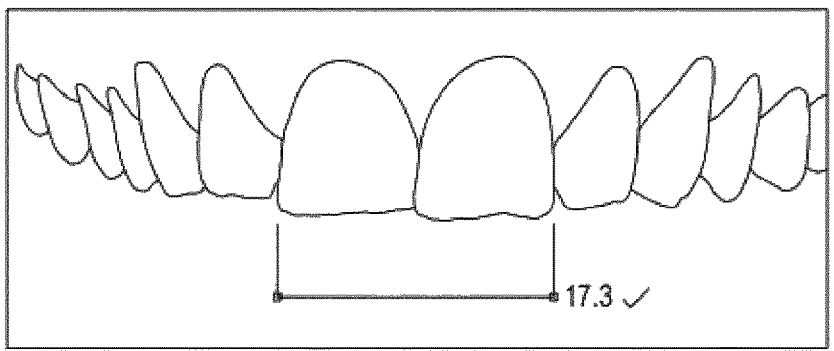
(f) Calibration
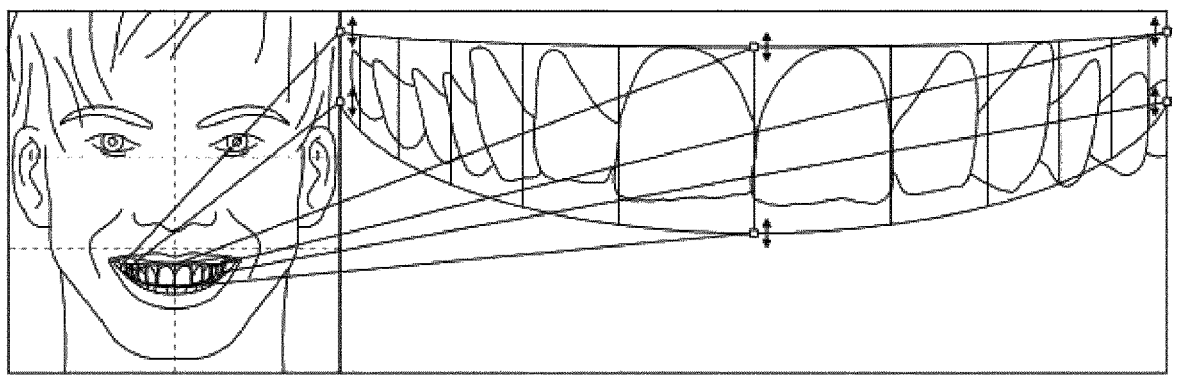
(g)    (h) Gingiva and smile curve
FIG 4

- capturing or generating or providing at least one digital representation of said tooth in its clinical environment
⌐1101

- characterising said tooth in its clinical environment, thereby obtaining a limited set of parameters
⌐1102 d) normalize the digital representation
⌐1103 e) performing colour correction
⌐1104 f) adding the at least one digital representation and adding the limited set of parameters to said digital library
⌐1105

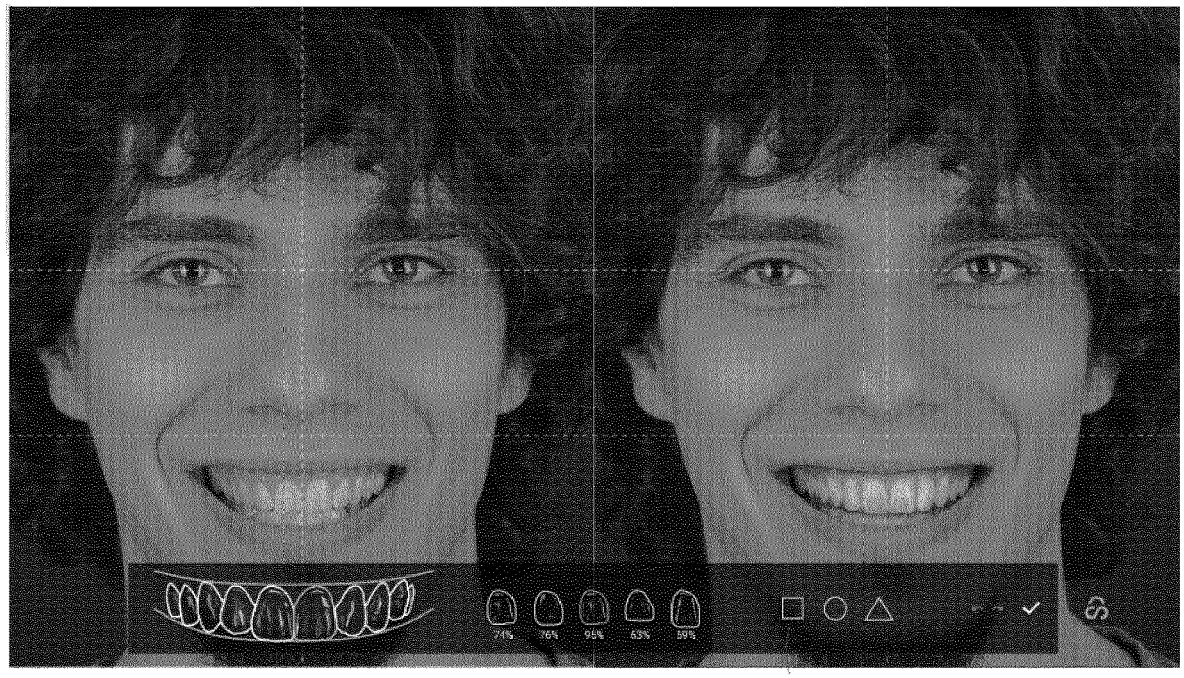
(a) (b)
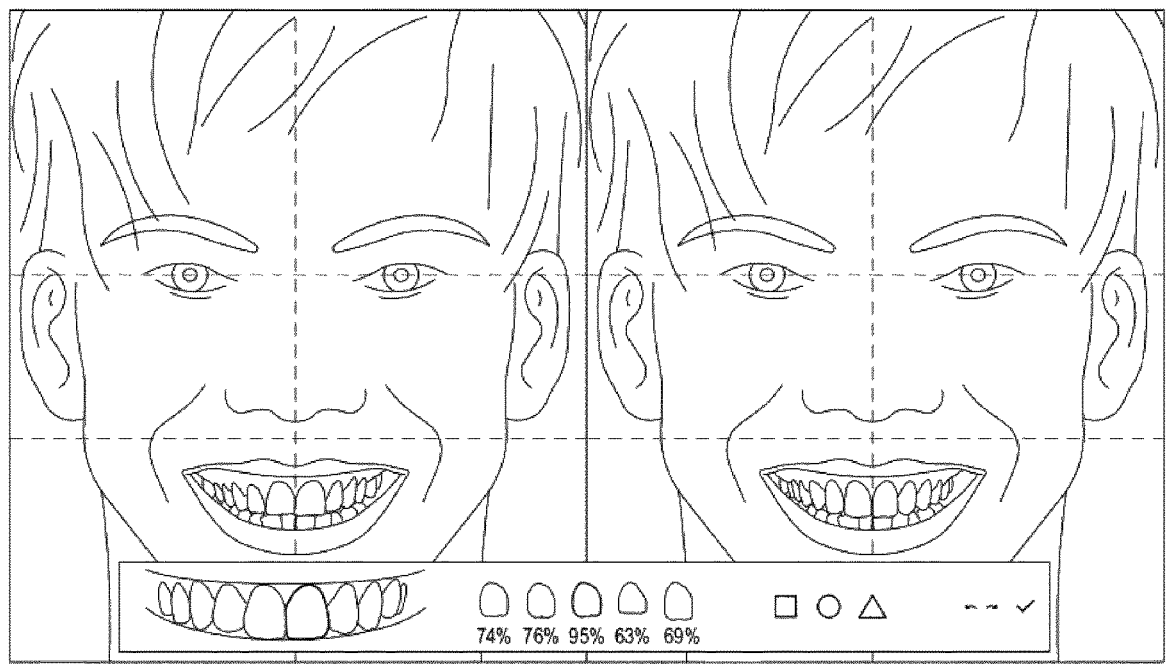
(c) (d)
FIG 16

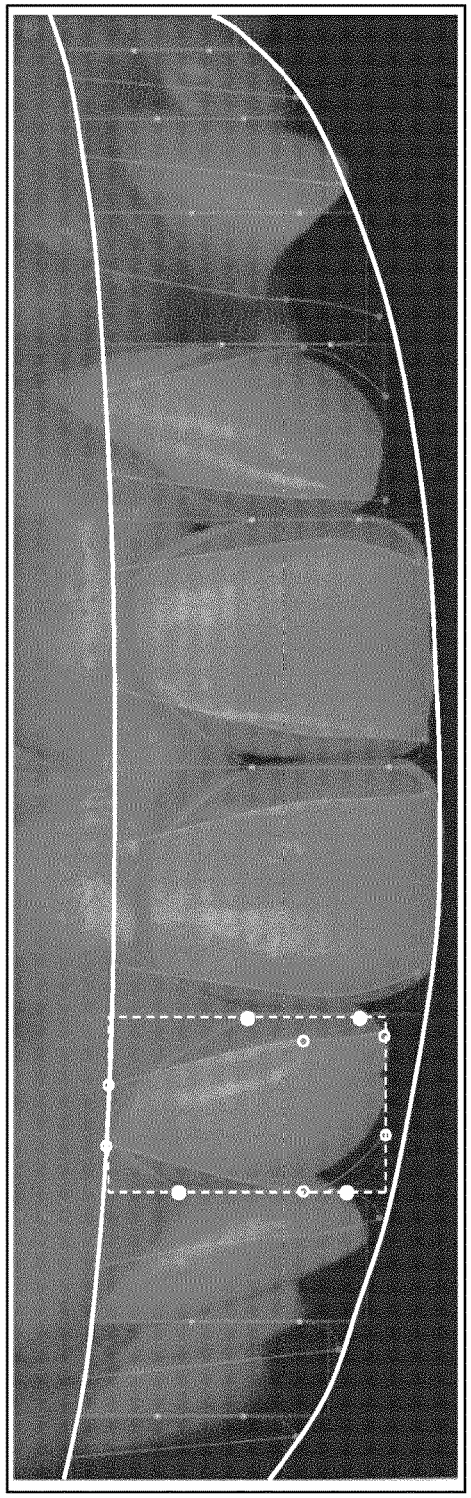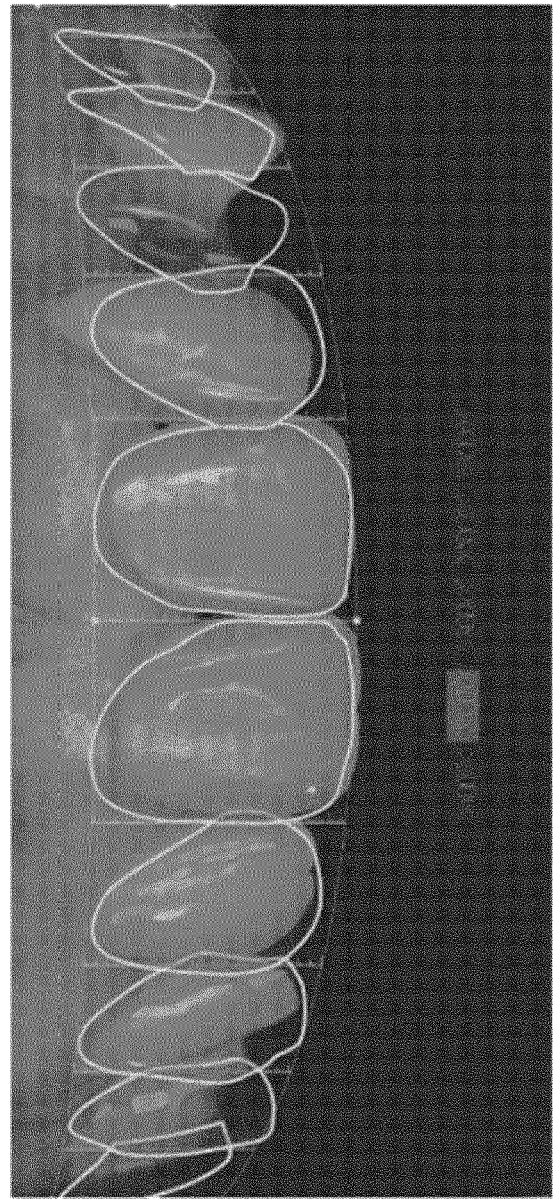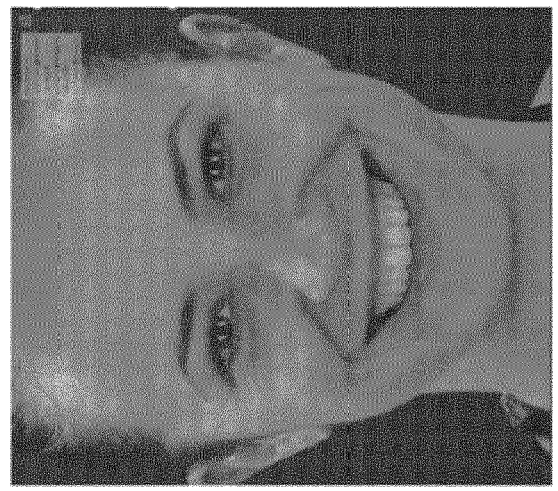
FIG 17

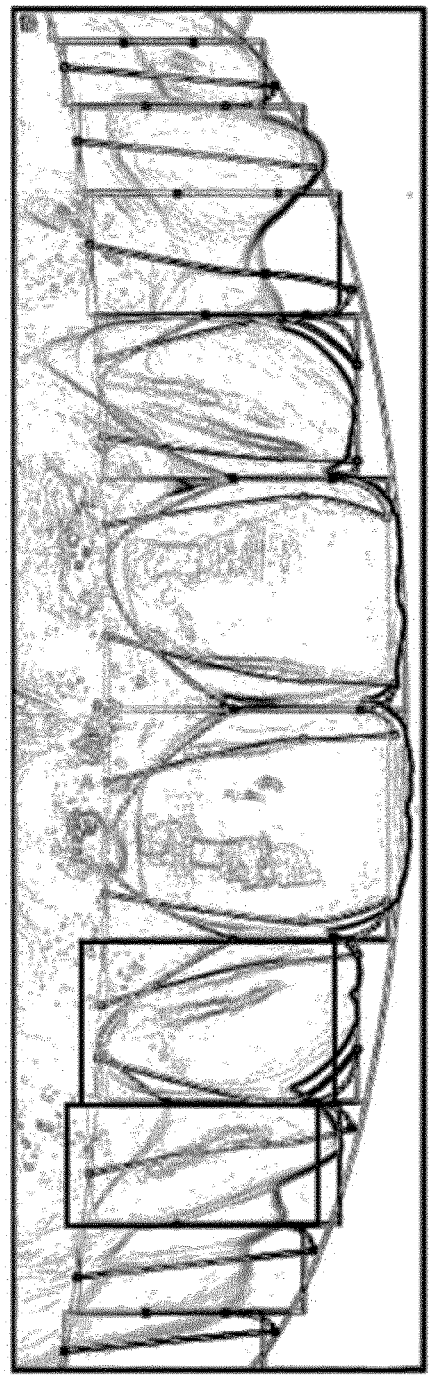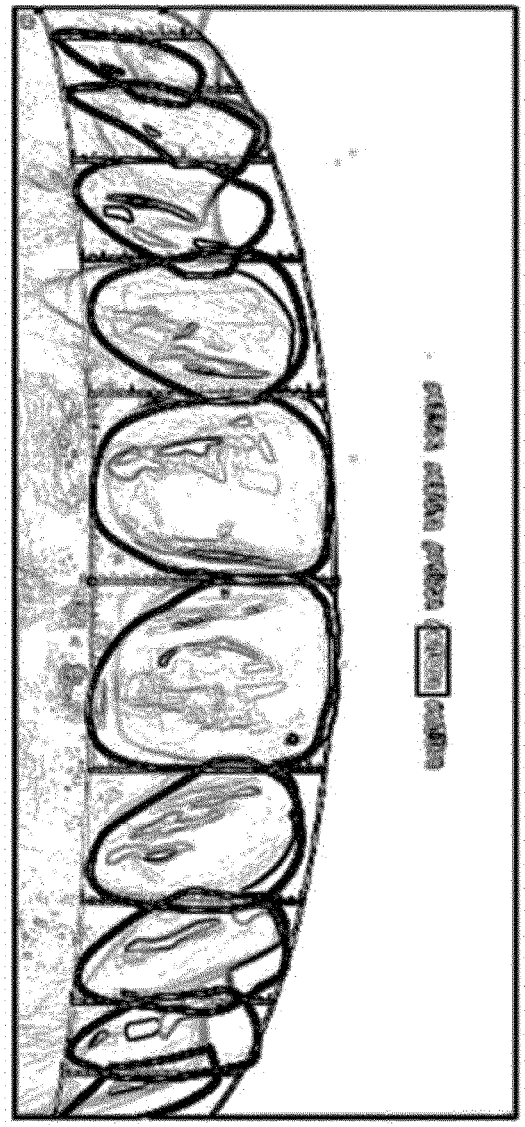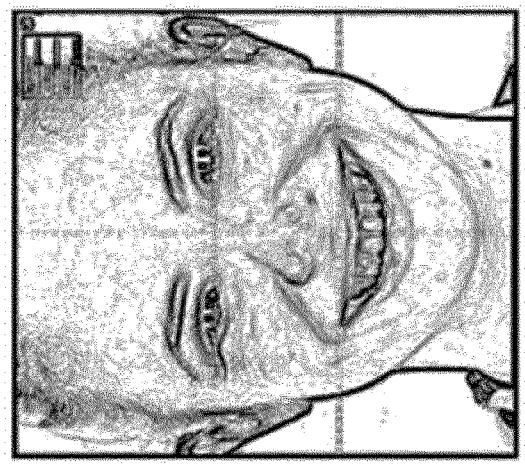
FIG 18

COMPUTER IMPLEMENTED METHODS FOR DEFINING A DENTAL RESTORATION

CROSS-REFERENCES TO RELATED APPLICATIONS

This application is a national-stage application under 35 U.S.C. § 371 of International Application PCT/EP2020/052638, filed Feb. 3, 2020, which international application claims the benefit of priority to European Patent Application No. 19155845.1, filed Feb. 6, 2019.

FIELD OF THE INVENTION

The present invention relates in general to the field of dental restoration. More in particular, the present invention relates to computer implemented methods for characterising a tooth, computer implemented methods for building a digital database of teeth, computer implemented methods for searching said database to find a matching tooth, computer implemented methods for designing or defining a dental restoration, and computer implemented methods for generating a physical object for dental restoration.

BACKGROUND OF THE INVENTION

Techniques for designing and manufacturing dental restorations such as e.g. crowns, bridges, abutments, implants, veneers, etc. are known in the art.

In recent years, computer programs for designing and manufacturing dental restoration are rapidly expanding. A first step in typical computer aided manufacturing processes is to create a 3-dimensional model of the patient's teeth. This is traditionally done by 3D scanning one or both of the dental gypsum models. The 3-dimensional replicas of the teeth are imported into a CAD program, where the entire dental restoration is designed. The final restoration 3D design is then manufactured e.g. using a milling machine, 3D printer, rapid prototyping manufacturing or other manufacturing equipment.

While CAD programs can help to design and visualize virtual 3D objects, it remains a challenge to obtain good results (e.g. accurately fitting, visually appearing, esthetical, etc.) using such programs, moreover in a fast and efficient manner.

US2013/0060532 describes a computer implemented method for designing a high aesthetic composition starting from a high number of interrelated virtual teeth.

There is always room for improvements or alternatives.

SUMMARY OF THE INVENTION

It is an object of embodiments of the present invention to provide a computer implemented method and a computer program product for characterising a tooth, more in particular to characterize a tooth in an oral space.

It is an object of embodiments of the present invention to provide a computer implemented method and a computer program product for characterising a tooth in an oral space in an efficient manner, e.g. with only a limited number of parameters or values, for example with at least 6 to at most 20 parameters or values, for example with at least 6 parameters or values and at most 8, or at most 10, or at most 12, or at most 14, or at most 16 or at most 18 or at most 20 parameters or values.

It is an object of embodiments of the present invention to provide a computer implemented method and a computer program product for determining a matching score of a tooth in an oral space of a patient and a virtual tooth from a digital database or library, preferably in a fast and efficient manner.

It is an object of embodiments of the present invention to provide a computer implemented method and a computer program product for finding a limited number of virtual teeth in a digital database or digital library matching a tooth in an oral space of a patient, e.g. having a matching score higher than a predefined score, preferably in a fast and efficient manner.

It is an object of embodiments of the present invention to provide a computer implemented method and a computer program product for building a digital database or library of teeth (e.g. of natural teeth) which is searchable in a fast an efficient manner.

It is also an object of embodiments of the present invention to provide a computer implemented method and a computer program product for converting an existing digital database or library of teeth into a digital database which is searchable in a fast an efficient manner.

It is an object of embodiments of the present invention to provide a computer implemented method and a computer program product for providing a photo-realistic 2D visualisation of how a face (e.g. a smile) of a particular patient will look like after dental treatment.

It is an object of embodiments of the present invention to provide a computer implemented method and a computer program product for providing a photo-realistic 2D visualisation of how a face (e.g. a smile) of a particular patient will look like after dental treatment, said treatment including cutting the gingiva, and/or adding tissue to the gingiva.

It is an object of embodiments of the present invention to provide a computer implemented method and a computer program product for automatically selecting from a digital library of teeth a limited number of candidate teeth for dental restoration of a particular tooth present in an intraoral space of the patient, optionally taking into account predefined modifications (e.g. enlarging the tooth).

It is an object of embodiments of the present invention to provide a computer implemented method and a computer program product for allowing a user to design or define a dental restoration of a patient, and for producing a 3D file suitable for producing the dental restoration.

It is an object of embodiments of the present invention to provide a computer implemented method and a computer program product for allowing a user to design or define a dental restoration of a patient, and for producing at least one physical object for the dental restoration.

These and other objects are accomplished by computer implemented methods, computer program products, and a database according to embodiments of the present invention.

According to a first aspect, the present invention provides a computer implemented method of characterising a tooth by analysing at least one digital representation of said tooth in its clinical environment, comprising the steps of: a) determining a parameter indicative for the unique position of the tooth in a mouth; b) determining a limited set of parameters for describing the tooth in a clinical environment, comprising: at least two parameter indicative of for describing a size of said tooth; at least one parameter for describing a first papilla height; at least one parameter for describing a second papilla height; at least two parameters for describing a shape or perceived shape of the tooth.

The parameter indicative for a position in the mouth may for example be an FDI number (World Dental Federation notation, also known as ISO 3950[2] notation), or a number according to another numbering system, for example the "Palmer notation" (used inter alia in the UK), or the "American numbering system", or any other suitable numbering system.

In an embodiment, the at least two parameters for describing a size of said tooth comprise or consist of two parameters indicative of a height and a width (in 2 dimensions).

In an embodiment, the at least two parameters for describing a size of said tooth comprise or consist of three parameters indicative of a height, a width and a thickness (in 3 dimensions).

In preferred embodiments, the limited set of parameters is less than 20 parameters per tooth, preferably less than 18, or less than 16, or less than 15 parameters per tooth.

In an embodiment, step b) comprises: at least one parameter for describing a first embrasure, and at least one parameter for describing a second embrasure.

Typically two parameters are used for each embrasure, but some of these parameters may be commonly used also for specifying the size and/or shape of the tooth.

In an embodiment, the at least two parameter for describing a shape or perceived shape of the tooth comprises: at least two parameters for describing a single transition line, or at least three parameters for describing one transition curve, or at least four parameters for describing two transition lines, or at least five parameters for describing one transition line and one transition curve, or at least six parameters for describing two transition curves.

In some embodiments, one or more parameters to describe transition lines may also be used to describe the left or right embrasure.

It is an advantage that the parameters are not abstract numbers, but are linked with visual aspects of the tooth (and thus with a smile).

In an embodiment, the shape or perceived shape of central incisors is characterised by only 8 to 12 parameters, or by 9 to 11 parameters, for example by 10 parameters.

In an embodiment, the shape or perceived shape of lateral incisors is characterised by only 8 to 12 parameters, or by 9 to 11 parameters, for example by 10 parameters.

In an embodiment, the shape or perceived shape of canines is characterised by only 5 to 9 parameters, or by 6 to 8 parameters, for example by 7 parameters.

In an embodiment, the shape or perceived shape of premolars is characterised by only 4 to 8 parameters, or by 5 to 7 parameters, for example by 6 parameters.

In an embodiment, the tooth is characterised by analysing a 2D image or a 2D scan comprising a representation of said tooth in its environment.

In an embodiment, the tooth is characterised by analysing a 3D image or a 3D scan comprising a representation of said tooth in its environment.

According to a second aspect, the present invention provides a computer implemented method of adding a digital representation of a tooth to a digital library, the method comprising the steps of: a) capturing or generating or providing at least one digital representation of said tooth in its clinical environment; b) characterising said tooth in its clinical environment using a method according to the first aspect, thereby obtaining a limited set of parameters; c) adding the at least one digital representation and adding the limited set of parameters to said digital library.

This method can be used to build a digital database or library of natural teeth, including parameters that allow the database to be searched in a fast and efficient manner, without having to analyse the pictures or scans while searching the database.

It is a major advantage of the specific parameters chosen, that they can be used to calculate a matching score in a fast and efficient manner, without having to analyse the pictures or scans while searching the database.

In an embodiment, the digital representation comprises a 2D frontal picture or a 3D facial scan comprising an image of said tooth and at least a portion of a gingiva above said tooth, and a portion of a left neighbouring papilla, and a portion of a right neighbouring papilla.

In an embodiment, step a) may further comprise processing the digital representation, by performing one or more of the following steps: rotating the digital representation, scaling or normalizing the digital representation, cropping the digital representation to keep only the area of interest, detecting a contour of the at least one tooth, correcting a colour of pixels corresponding to gingival or papilla tissue, etc.

According to a third aspect, the present invention also provides a computer implemented method of enhancing an existing digital database that comprises at least one digital representation of a tooth in its oral environment, the method comprising the steps of: a) obtaining at least one digital representation of a tooth from the existing database; b) characterising said tooth using a method according to the first aspect, thereby obtaining a limited set of parameters; c) adding the limited set of parameters to the existing database.

Preferably step a) to c) are repeated for all relevant objects in the database.

It is an advantage of this method that the resulting database is searchable.

According to a fourth aspect, the present invention also provides a computer implemented method of converting an existing digital database that comprises at least one digital representation of a tooth in its oral environment, the method comprising the steps of: a) creating a second database; b) obtaining at least one digital representation of a tooth from the existing database; c) characterising said tooth using a method according to the first aspect, thereby obtaining a limited set of parameters; d) adding said at least one digital representation and the limited set of parameters to the second database.

It is an advantage of this method that the resulting database is searchable.

According to a fifth aspect, the present invention also provides a digital database produced by a method according to the second, third or fourth aspect.

According to a sixth aspect, the present invention also relates to a computer implemented method of determining a matching score between an existing tooth in an intraoral space of a patient or of an envisioned tooth in said intraoral space of said patient and a tooth selected from a digital database as can be generated by a method according to the second, third or fourth aspect, the method comprising the steps of: obtaining a first limited set of parameters that characterize the existing tooth or the envisioned tooth, using a method according to the first aspect; receiving a second set of parameters, or retrieving a second limited set of parameters of the tooth selected from the digital database; calculating a matching score based on the first limited set of parameters and the second limited set of parameters.

With "matching score" is meant a "degree of agreement".

In an embodiment, step c) comprises calculating the matching score based on differences or deviations between corresponding parameters from the first limited set and the second limited set.

According to a seventh aspect, the present invention also provides a computer implemented method of searching in a digital database of teeth as can be generated by a method according to the second, third or fourth aspect, and of automatically retrieving from the database a limited set of candidate teeth, the method comprising the steps of: a) obtaining or determining a first limited set of parameters that characterize the existing tooth or the envisioned tooth, using a method according to the first aspect; b) creating a list or an array of objects, each object containing at least a pointer or a reference to items of the database, and a matching score; For at least a subset of the digital teeth stored in the digital library, performing the steps c) to e), including c) retrieving a second limited set of parameters of the tooth selected from the digital database; d) calculating a matching score based on the first limited set of parameters and the second limited set of parameters; e) updating said list or array so as to keep pointers or references to the candidate teeth having the highest score; f) providing the list or array with pointers or a references to matching teeth, and their matching score.

It is a major advantage of this method that it allows fast and easy finding of a "well matching" or even the "best matching" tooth. As far as is known to the inventors, such a function is not provided by prior art solutions, but instead, the user (e.g. dentist) has to manually select a tooth from a catalogue, which choice is very time-consuming and very subjective.

According to an eight aspect, the present invention also provides a computer implemented method for providing a 3D file for producing a dental restoration, the method comprising the steps of: a) providing at least one digital representation of at least one tooth in an oral space of a patient; b) showing a plurality of visual objects to characterise said at least one tooth in said oral space; d) searching and retrieving a limited number of candidate matching teeth from a digital library of teeth based on said characteristics, according to the seventh aspect; g) providing a 3D-file of at least one selected matching tooth.

It is an advantage of this embodiment that it generates a 3D-file which can be used to create a physical realisation of the one or more dental restoration.

In an embodiment, the computer implemented method further comprises one or more of the following steps: c) after step b) and before step d) of optionally allowing a user to repeatedly adjust and/or modify one or more of said visual objects; e) after step d) of optionally allowing a user to repeatedly select another matching tooth from the limited set of candidate matching teeth; f) after step d) or after step e) and before step g) of optionally providing a photo-realistic 2D image of the patient with an overlay of the selected matching tooth; g) after performing step f), producing at least one physical object based on said 3D file.

The present invention also provides a computer program product containing executable instructions which perform a method according to any of the first, second, third, fourth, sixth, seventh, or eighth aspect, when being executed on a computer device having or being connected to a display.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 2 shows an example of an upper jaw of a person (with a missing tooth) before dental restoration (FIG. 2a and FIG. 2b). This smile is generally considered to be not beautiful.

FIG. 3 shows the upper jaw of the same person of FIG. 2 after dental restoration and after surgery. This smile is generally considered to be beautiful.

FIG. 4(a) to FIG. 4(h) show several steps which can be used in embodiments of the present invention, for obtaining an image (e.g. a normalized image) of an intraoral space as digital input for planning or designing or defining a dental restoration.

FIG. 11 is a flow chart of an exemplary computer implemented method for building a digital database or digital library of teeth, according to an embodiment of the present invention.

FIG. 16(a) shows a 2D picture or a 2D scan of a patient before dental treatment, and FIG. 16(b) shows a clinical realistic and photo-realistic 2D picture of how that patient will look like after dental treatment.

FIG. 16(c) and FIG. 16(d) are line drawings for FIG. 16(a) and FIG. 16(b).

FIG. 17(a) and FIG. 17(c) show a 2D picture of the teeth shown in FIG. 2(a), overlaid with a grid, as can be used in embodiments of the present invention.

FIG. 17(b) shows a photo-realistic picture of how the patient will look like after dental treatment.

FIG. 18(a) to (c) are line drawings for FIG. 17(a) to (c).

Figure 1:
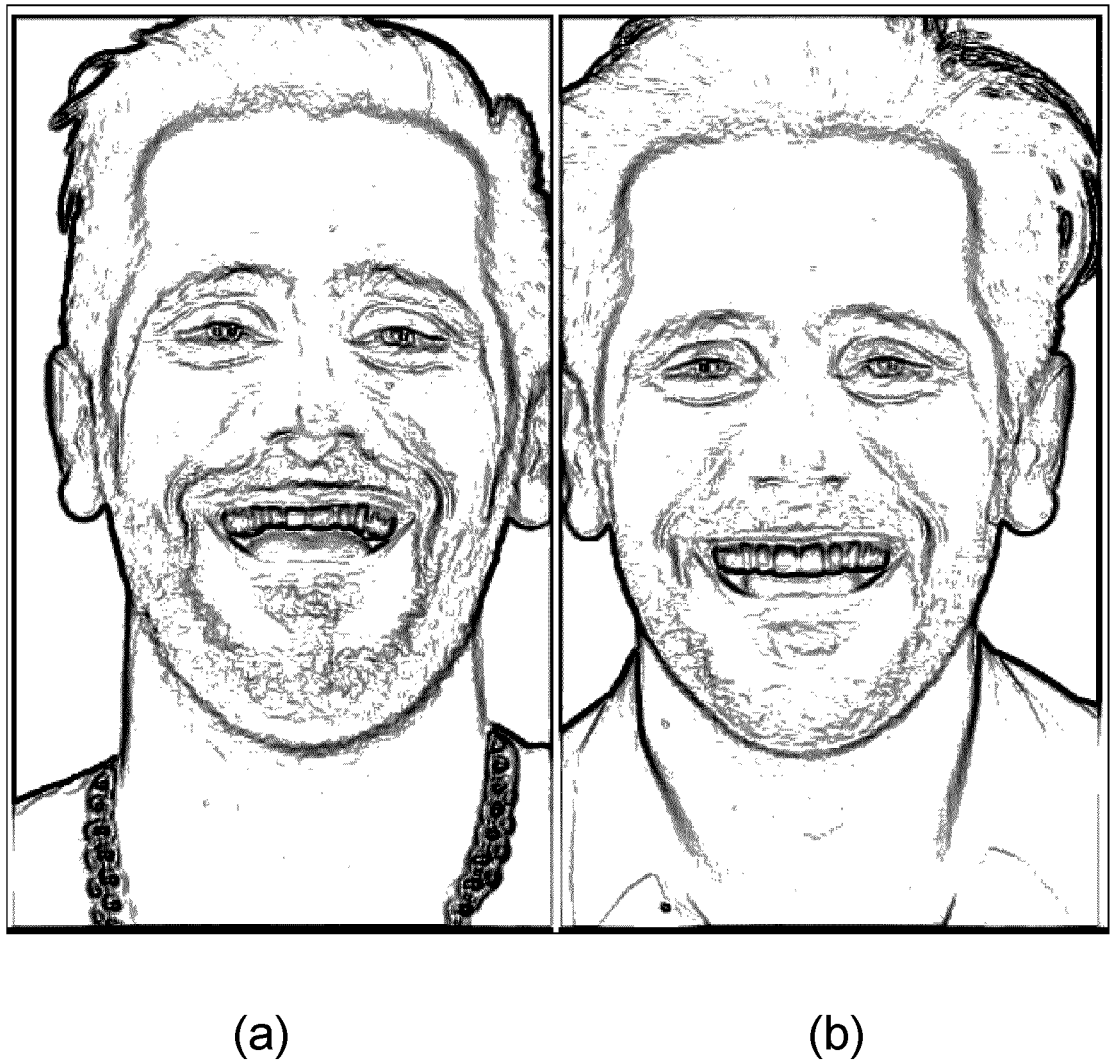
FIG. 1 shows an example of a person before dental restoration (FIG. 1a), and after dental restoration (FIG. 1b). The restorated teeth are longer than the original teeth.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "digital database" and "digital library" are used as synonyms.

In this document, the terms "future teeth" or "desired teeth" or "designed teeth" or "newly defined teeth" or "envisioned teeth" or "target teeth" or the like, mean the same. In the context of the present invention, such expressions may refer to a set of parameters, e.g. a set of points characterising an envisioned tooth, or to a 2D bitmap representation of a tooth found in a digital library corresponding to this set of parameters or points, or to a corresponding physical object (e.g. a veneer), depending on the context.

In this document, the term "transition lines" (of a tooth)" may refer to the upright, e.g. vertical transition from the labial surface of an anterior tooth to the interproximal surface, and may in this document also be referred to by "line angles" or by "reflection lines". Likewise the terms "transition curves" or "reflection curves" refers to such transition which is not linear.

The present invention relates in general to methods and techniques and tools, e.g. computer aided techniques and tools for dental restoration, such as for example crowns, bridges, abutments, implants, or veneers. The present invention relates in particular to computer implemented methods, and/or computer programs and/or software modules to perform one or more of the following:

to automatically characterize a tooth in its environment, e.g. to characterize a shape and size of a tooth of a patient in an intraoral space, e.g. by means of a limited set of parameters, e.g. by means of a relatively small set of points (e.g. at most 20 points) in a 2D or 3D image, to allow a user (e.g. a dentist) to adjust one or more of these characteristics in a simple and efficient manner, e.g. by allowing the user to change one or more of these parameters, e.g. by shifting points in a 2D or 3D image, thereby specifying or defining characteristics of the future teeth (e.g. dentally restored teeth), to build a digital database of teeth (e.g. of natural teeth), which database is searchable in a fast and efficient manner, to determine a matching score between two teeth, for example an existing tooth in an intraoral space of a patient (on the one hand) and a virtual tooth in a digital database (on the other hand), to find a limited number (e.g. at most ten or at most five or at most three) virtual teeth in a digital database having a good match with a particular tooth of a patient, e.g. having a matching score higher than a predetermined value (e.g. higher than 85%, or higher than 90%, or higher than 95%), preferably in a fast and efficient manner, to provide a clinically realistic (e.g. what is clinically possible) and a photo-realistic (e.g. not robotic or cartoon-like) 2D picture or 2D image of how a face (or a portion thereof, in particular a smile) of a particular patient will look like after dental treatment, for example (but not limited) to cases where the gingiva will be cut, to define and/or generate a 3D-digital representation of one or more dental restorations for a patient, for manufacturing said dental restoration, to actually create a 3D physical object for dental restoration, e.g. a veneer or a crown or the like, and/or combinations hereof.

The inventors of the present invention have many years of experience as dentists, in particular for improving or restorating a "smile" of a patient, an example of which is shown in FIG. 1.

FIG. 1(a) shows a picture of a person having relative short teeth. FIG. 1(b) shows the same person after dental treatment, which in this particular case was a purely cosmetic treatment without surgery. Traditionally, such a treatment typically involves several steps, including:

a) the design of artificial teeth or artificial teeth portions having a suitable size and shape, b) making or producing physical objects, e.g. veneers of about 1 mm thickness, comprising or consisting of ceramics or composite materials, e.g. by 3D printing, c) applying, e.g. bonding or gluing said physical objects to the existing teeth of the person.

This is known for many years, and as stated for example in the background section of US patent application US2013/0060532, can be partially supported by CAD programs, in particular step a).

While such CAD programs are very useful, some problems or challenges remain, and other problems arise.

(i) For example, a very important aspect when designing "a smile" is that the end result has to be visually attractive or beautiful or aesthetic. In fact, this is often the only reason why patients start the treatment, but CAD programs or computers in general are not aware of "beauty", and for inter alia this reason, there is a common believe that the choice of how the future teeth should look like, is purely subjective. Some CAD programs therefore allow the user (e.g. the dentist and/or the patient) to select a "nice looking" tooth from a catalogue of digital teeth, which is difficult enough to select from, and moreover, the dentist or patient then has to modify the shape and/or size to make it fit between the other teeth. This process is very time consuming. In fact, the inventors have discovered that there is a first group of dentists who spend a relatively long time (e.g. typically at least 20 minutes) searching in the digital database for a nice tooth, and subsequently spend typically at least another 20 minutes for adjusting the selected tooth to make it fit; and that there is a second group of dentists who always use the same four or five teeth from the entire database, and typically spend at least 30 minutes adjusting them, trying to make them fit, and trying to provide an overall aesthetic smile.

(ii) Another shortcoming that some existing CAD programs have, is that they do not show a photo-realistic picture of how the person will look like after dental treatment, but instead provide a rather robotic or cartoon-like picture. This is especially true for CAD programs based on 3D models. Many patients do not like such result, and do not proceed with the treatment, which is a pity, because the robotic pictures are not what they will really look like after treatment.

(iii) A particular insight that the inventors have learned over the years is that some existing CAD programs do provide a photo-realistic image of the patient after the envisioned treatment, but the image image did not always correspond with reality.

Confronted with these technical shortcomings while being passionate about natural beauty, and desiring to help patients who are unhappy with their current dental situation, e.g. with their smile, the inventors came to the insights and ideas and solutions described below, constituting the present invention.

Before describing the proposed solution(s), one of the insights underlying the present invention will be explained with reference to FIG. 2 and FIG. 3.

FIG. 2(a) and FIG. 2(b) show a grayscale image and a line drawing of an example of an upper jaw of a person having a missing tooth (indicated by arrow 2) and a recess in the gingiva above the left lateral incisor (indicated by arrow 1). Not surprisingly, this person was not happy with her current set of teeth.

FIG. 3(a) and FIG. 3(b) show a grayscale image and a line drawing of the upper jaw of the same person of FIG. 2 after surgery (wherein e.g. tissue was added at the location indicated by arrow 1) and after dental treatment (with e.g. a dental implant at the location of arrow 2, and a plurality of veneers bonded to the other teeth visible in FIG. 3a).

Figure 6:
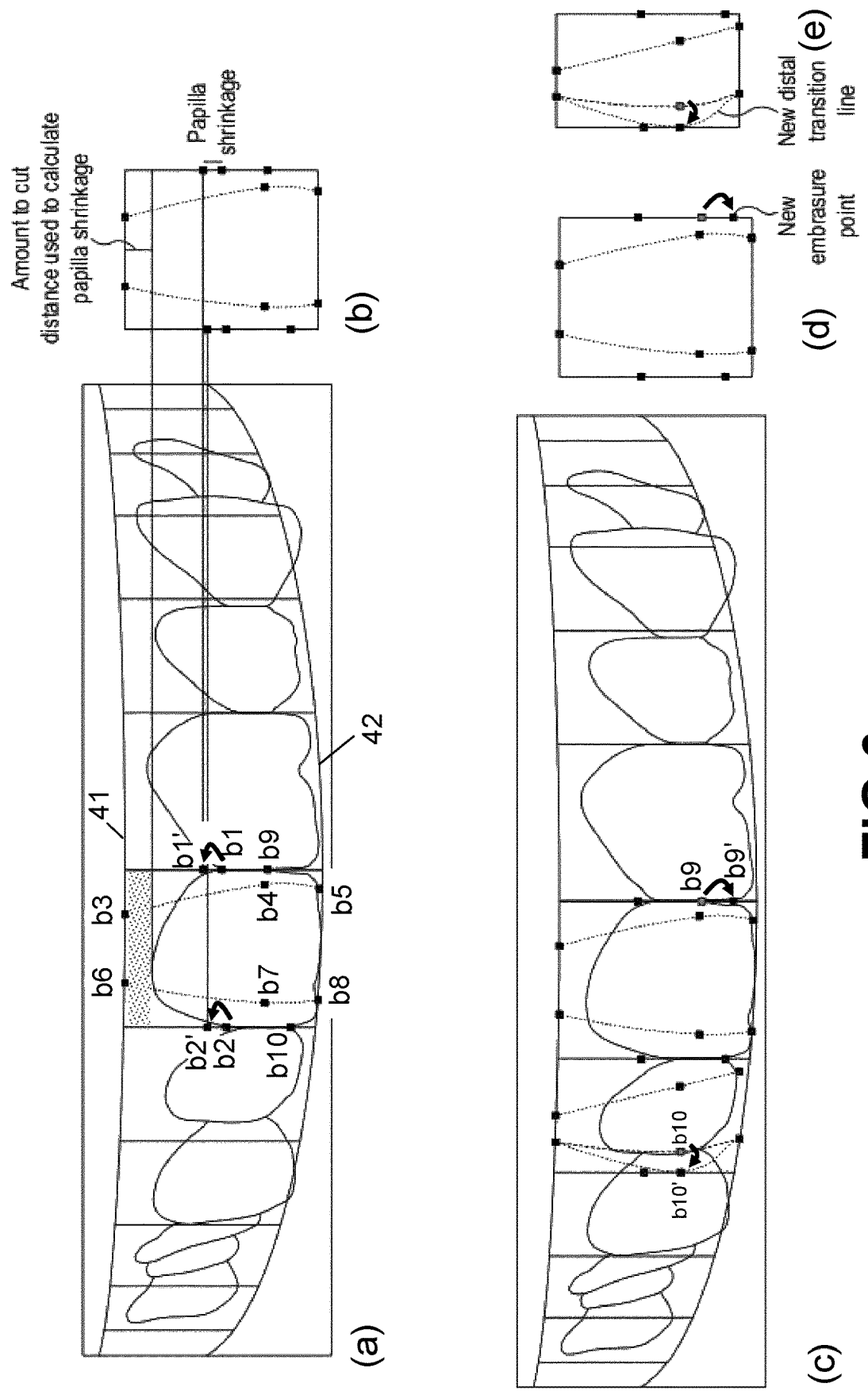
FIGS. 6(a) and (b) illustrate an important insight underlying some of the principles of the present invention.
FIG. 6(c) to (e) illustrate how future (or envisioned teeth) can easily and rapidly be designed or defined by merely shifting one or more of the characteristic points of the existing teeth.

Two of the insights which the dentists had gained before this treatment was performed, and which was taken into account when "designing" the future teeth of this person, or rather when "defining" the future teeth of this person, (which difference will become clear further), are:

i) that it is possible to add tissue (e.g. by transplantation) to the gingiva above a central line of a tooth (e.g. at arrow number 1), but it is not (normally) possible to add tissue to the papilla (e.g. at arrow number 2); and ii) that, in cases where the gingiva is cut (e.g. as shown in FIG. 6a), the papilla will slightly shrink.

As far as is known to the inventors, these insights are not known in the art, but experience has learned that these are very important when designing or defining new teeth of certain patients (where tissue is to be added or removed), e.g. because otherwise a gap or opening will occur between the new teeth, below the shrunk papilla.

It is pointed out that, even though these insights were mainly gained from treatments involving surgery, the solutions presented herein, in the form of computer-implemented methods or computer programs or a searchable database, do not involve surgery, and hence constitute patentable subject matter.

Likewise, even though an ultimate goal of the dentists is to create a beautiful smile for the patient, the invention is not directed to an aesthetic creation per se, but provides technical solutions to technical problems, and thus constitutes patentable subject matter, even if the solution is also beautiful.

FIG. 4 shows several (preparatory) steps which can be used in embodiments of the present invention, for obtaining an image (e.g. a normalized 2D image) of an intraoral space as digital input for further processing, e.g. for designing or defining or planning a dental restoration.

FIG. 4(a) shows an exemplary 2D image of a smiling person, for example a portrait image captured by a digital image camera.

FIG. 4(b) shows a subpicture of FIG. 4(a) after identifying a face midline, after cropping the picture and after rotating the face. This can be done for example using two reference points on the face, e.g. the philtrum and the *glabella*, or the eye centres, or in another suitable way.

FIG. 4(c) shows how the inner contours of the lips can be defined (e.g. by allowing a user to manually indicate a plurality of points by clicking a mouse), or automatically detected, for example using edge detection techniques, or a combination hereof. The lip contours define an area (shaded area in FIG. 4c) which will be updated or partially updated with a visualisation of one or more future teeth (see FIG. 4g or FIG. 15b or FIG. 16b, or FIG. 17b).

FIG. 4(d) shows the picture of FIG. 4(b), but wherein the intraoral area indicated in FIG. 4(c) is or can be partially overlaid with one or more future teeth, as will be explained next.

FIG. 4(e) is an enlarged view of the shaded area shown in FIG. 4(c), showing a 2D image of the current clinical situation and an additional grid overlaid over the 2D-image. The grid comprises an upper curve 41 and a lower curve 42 and a plurality of vertical line segments. The upper curve 41 can be used to indicate a (current or future) transition between upper ends of at least some of the teeth and the (current or future) gingiva. The lower curve 42 can be used to indicate a lower end of at least some of the teeth. The vertical line segments can be used to define substantially rectangular areas or rectangular areas (see e.g. FIG. 5b and FIG. 17a) comprising individual teeth. The picture of FIG. 4(e) is also referred to herein as the "restorative space".

FIG. 4(f) shows an example of how the picture of FIG. 4(e) can be normalized or calibrated, for example based on a distance (in the example 17.3 mm) between incisal embrasures between canines and first premolars, but another distance may also be used. This distance can for example be measured in the mouth using a vernier gauge or a caliper, or can be measured on a gypsum model, or extracted from a 3D STL file, or determined in any other way.

FIG. 4(g) and FIG. 4(h) are similar to FIG. 4(d) and FIG. 4(e), but indicate that a user (e.g. a dentist or the patient) can change the position of the upper curve 41 and/or the lower curve 42, to thereby define the height (e.g. the desired height) of the future teeth, for example by dragging some reference points of the curves (e.g. as indicated with circles or squares).

In preferred embodiments of the present invention, the database contains a plurality of photorealistic 2D pictures of teeth, each with a portion of gingival tissue (at the top) and a portion of papilla tissue (at the sides) and with some amount of shadow (at the bottom), and preferably the visualisation of the future dental situation of FIG. 4g may include overlaying a portion of the picture of FIG. 4(b), e.g. a portion of the area indicated in FIG. 4(c), using one or more pictures from the database, for example using semi-transparency for pixels comprising tissue information and/or shadow information, and non-transparency for pixels comprising dental information. When actually designing or defining the future smile, the picture of FIG. 4h may further include an overlay of one or more 2D contours of the one or more teeth selected from the library (e.g. as shown in FIG. 7e or FIG. 15b or FIG. 17c).

In preferred embodiments of the present invention, the picture of FIG. 4(g) and FIG. 4(h) are simultaneously shown on a display, and are synchronously updated for each modification made (as will be explained further), for example when replacing one of the existing teeth by a larger tooth from the library. The picture of FIG. 4(h) may display the original tooth and a contour of the new tooth, while the picture of FIG. 4(g) may display a photo-realistic 2D image of the new tooth from the library combined with the original picture, for example using semi-transparency).

In embodiments of the present invention, a user interface (e.g. a graphical user interface) may comprise an area like the one shown in FIG. 4(h) functioning as the "working area", and also an area like the one shown in FIG. 4(g) where a photo-realistic image is displayed which can be considered as the "result area". An example of such a user-interface is shown in FIGS. 17(b) and (c).

As described above, existing CAD tools typically use 3D models of teeth, where an outer surface of a tooth is typically described or defined by a huge number of "finite elements". An advantage of such representation is that it allows (a computer) to accurately describe very complex 3D shapes, but a disadvantage (for human users) is that modifying such a model to meet future teeth requirements (e.g. an envisioned length), moreover in a manner in which the result remains beautiful (as a constraint), is very difficult and very time consuming, and my require training. That is probably why several dentists always use the same four or five model teeth over and over again.

The inventors of the present invention took a radically different approach, and asked themselves "what is the point of building or designing artificial 3D teeth models when nature already provides us with thousands of millions (e.g. about $6\times10^9$) samples of teeth, at least 30% of which are beautiful. They wondered if it would be technically possible to make use of what nature has already "designed", to "digitize and store" a subset of that information in a database, and to "select" suitable teeth from that database when planning a dental restoration. They envisioned that, if the database is sufficiently large, no modification whatsoever would be required, and "design could be replaced by selection". They realised that, while the database is not yet sufficiently large, or for other practical reasons (e.g. storage capacity), it would be good to allow some simple modifications or adjustments (such as scaling). The biggest problem of this idea is "how to find a good matching tooth from the database, in an efficient manner".

As far as is known to the inventors, current CAD-tools do not address this problem. In particular, they do not allow to search a database of digital teeth to find a good match for an existing tooth of a patient, at least not in a highly efficient manner, but instead present the user (e.g. the dentist or patient) with a catalogue of teeth, (typically comprising for example 50 to 100 sets of 10 to 12 types of teeth), from which the user can select one, for example one that subjectively looks beautiful, but then the user still needs to adjust the shape and/or size of the tooth, to make it match the clinical situation.

Confronted with these challenges, the inventors came to the idea of providing a computer implemented method of characterising a tooth by analysing at least one digital representation of said tooth in its clinical environment, the method comprising the steps of:
a) determining a parameter indicative for a position of the tooth in a mouth, for example an FDI-number, or a number according to another system, e.g. according to the American tooth numbering system; and
b) determining a limited set of parameters (e.g. only about 8 to 12, e.g. about 10 parameters for central incisors and for lateral incisors, only about 5 to 9, e.g. about 7 parameters for canines, and only about 5 to 7, e.g. about 6 parameters for premolars) for describing the tooth in its clinical environment (e.g. with respect to the gingiva at the top of the tooth, and with respect to the papilla's on the left and the right of the tooth).

The limited set of parameters comprises at least two parameter for describing a size of said tooth, for example a height H and a width W (see e.g. FIG. 5b), or a height H and a proportion, or a width W and a proportion, where proportion is defined as width divided by height; and at least one parameter for describing a first papilla height (see for example point a1 in FIG. 5a), and at least one parameter for describing a second papilla height (see for example point a2 in FIG. 5a).

Experiments have shown that surprisingly good results (e.g. in terms of processing speed, and in terms of physically matching or resembling) can be obtained even when using only a very limited set of parameters (e.g. only a relatively small number of characteristic points, e.g. at most 20 points), as opposed to the huge number of points typically used in 3D models based on "finite elements".

It is explicitly pointed out that not only characteristics of the tooth itself are taken into account, but also characteristics of tissue in direct contact with the tooth, in particular the papilla's on both sides of the tooth. As described above, it can be avoided that an opening will occur after dental treatment, which would not only negatively influence the beauty of the dental restoration, but would also create a cavity which may be a cause for increased tooth decay.

The limited set of parameters are the clue that enable a database of teeth to be searchable, and as will be described further, also allow a "matching score" to be determined, and also allow software tools to automatically provide a limited set of (candidate) matching teeth, thereby removing a huge burden from the users (e.g. dentists or patients). In addition, this concept also allows the user to adjust the shape and/or size of the future teeth in a very simple manner (e.g. by simply dragging or moving points in a picture). In addition, in case the database also contains 2D pictures, and because the searching in the database is so fast, the software can almost instantly show the results of the adjustments by means of a photo-realistic image. These are the main underlying ideas of the present invention.

It is noted that this solution goes directly against the common believe that the selection of future teeth is purely subjective. Firstly because the characteristic points can be automatically determined, and secondly, because the "best matching tooth" from the database can be automatically found, according to a predefined matching criterion. This is unprecedented. In preferred embodiments of the present invention, however, the user has some freedom of choice (e.g. when defining the future length of the teeth), as will be explained further, but once this choice is made, a computer can almost immediately search another best matching tooth (or a limited number of best matching teeth), and can almost immediately visualize how the person will look like after dental treatment. This will be described in more detail in FIG. 14.

In case the parameters are points or positions in a 2D image, each parameter may for example comprise two coordinates (e.g. an X and a Y-coordinate). In case the parameters are positions in a 3D space, each parameter may comprise three coordinates (e.g. an X, Y and Z-coordinate).

The at least two parameters for describing a size of the tooth may be a Height [e.g. in mm] and a Width [e.g. in mm]; or a Height [e.g. in mm] and a Proportion [as a %]; or a Width [in mm] and a Proportion [as a %], where proportion is defined as Width/Height.

The digital representation of the "tooth in its direct environment" may be any suitable digital representation in 2D or 3D, for example a 2D facial picture, or a 3D facial scan, or a 3D intraoral scan, or a frame of a digital 2D movie, or a frame of a digital 3D movie, or a stereoscopic picture, etc. In embodiments of the present invention, at least some of the parameters or points or positions are not expressed as absolute values [in mm], but as relative values [e.g. as percentages], for example relative to a rectangle substantially surrounding the currently existing tooth (before dental treatment) or the envisioned future tooth (after dental treatment). An example of such a rectangle is shown for example in FIG. 5b.

In preferred embodiments, the tooth may be characterised by two or four additional parameters for describing a first and a second embrasure (see e.g. points a8 and a5 of FIG. 5a, or points a8, a5, a9 and a10 of FIG. 5a).

The inventors also surprisingly found that the overall shape of the tooth can be described in a highly efficient manner by means of only a few well chosen parameters. In some embodiments based mainly on 2D pictures, the 3D-shape of the tooth can be efficiently described by means of "transition lines" or "transition curves", also referred to herein as "reflection lines" or "reflection curves". Moreover, as will be described further, such lines or curves can be efficiently described by means of only four or only 6 parameters with surprisingly good results. As far as is known to the inventors, this technique is not known in the art. In contrast, what is known, is the use of a single central line (known as "tooth axis"), but experiments have shown that using two lines or curves, especially for the central incisors and the lateral incisors, moreover coded by means of only four or only six points, leads to amazingly good results, while keeping computational efforts low. This is another underlying idea of at least some embodiments of the present invention.

The present invention will now be described in further detail, by way of examples, and with reference to FIG. 5 to FIG. 18.

Figure 5:
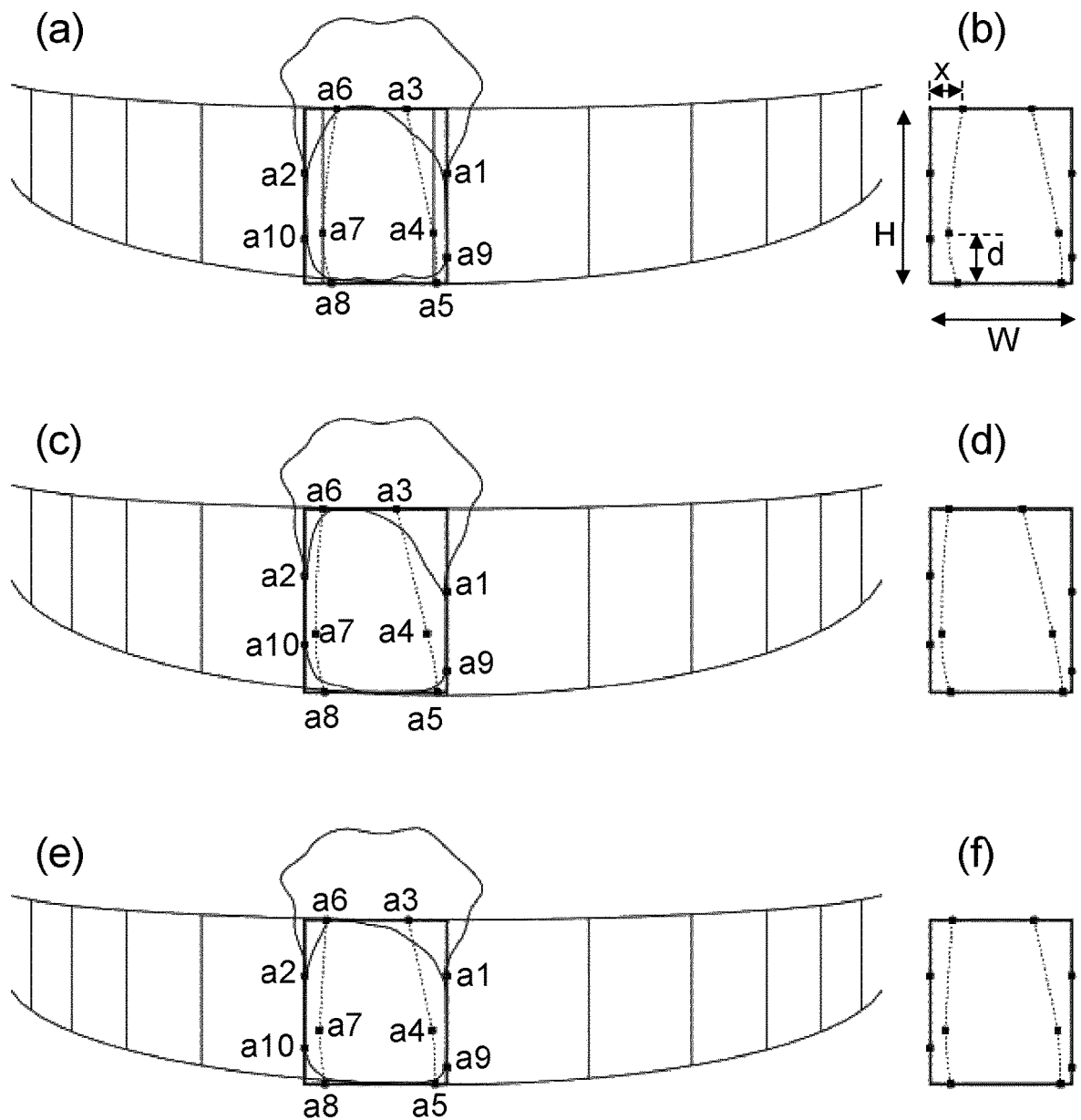
FIG. 5(a) to FIG. 5(f) show examples of how the shape and size of a central incisor in its environment (in the oral cavity) can be characterised or specified, using a limited number of parameters, e.g. a limited number of characteristic points, according to an aspect of the present invention.

FIG. 5 shows three examples of how a central incisor can be characterised by means of 10 points a1 to a10. In the three examples, the height H and the width W (see FIG. 5b) of the central incisor is the same, but the papilla heights and the shape of the three exemplary teeth (of FIGS. 5a, 5c and 5e) are different.

As shown, a rectangle is drawn, the edges of which are tangential to a contour of the tooth.

The point a1 located on a first vertical edge of the rectangle indicates a first papilla height.

The point a2 located on a second vertical edge of the rectangle indicates a second papilla height.

The points a3, a4 and a5 specify the location of a first transition curve. The point a3 is located on an upper side of the rectangle. The point a5 is located on a lower side of the rectangle. The point a4 is located inside the rectangular area, and its preferably chosen such that the shape of a curve, e.g. a spline or a polynomial or another parametric curve through the points a3, a4 and a5 corresponds relatively well with the actual transition line of the existing tooth as can be seen in the 2D facial picture. In the examples shown in FIG. 5, the point a4 is chosen at a predefined distance (d) equal to about 30% of the height H of the tooth, measured from the bottom side of the rectangle, or 70% of the height H of the tooth measured from the top, but of course the present invention is not limited thereto, and another distance "d" can also be used.

Likewise, the points a6, a7 and a8 specify or indicate the location of a second transition line of the tooth.

Points a6 and a3 indicate the intersection of the transition curves and the upper edge of the rectangle.

Likewise the points a8 and a5 indicate the intersection of the transition curves and the lower edge of the rectangle.

The points a9 and a10, located on the vertical edges of the rectangle, determine the embrasures of the tooth.

Experiments have shown that by using this limited set of only ten points, the shape and size of the central incisor can actually be very well defined. It should come as a surprise to the reader that the tooth actually being a 3D object can be very well characterised by these ten points in a 2D-picture. It is further noted that these points are not merely "abstract points" in a picture, but correspond to real physical locations on a real tooth of a real person, and these points are strategically chosen (except maybe for the points a4 and a7 which could also be chosen slightly higher or lower).

In alternatively embodiments, the points a9 and a10 could be omitted from the set, and predefined values for the embrasures could be used instead.

As already suggested above, the position of the points a1 to a10 can be unique defined by means of ten numerical values, for example percentages or floating point values or integer values. For example, a value of 20% may be assigned to the parameter a6, meaning that the point a6 is located at a distance x=20% of W from the left edge of the rectangle. Likewise, the other points can also be represented by percentage values relative to the edges of the surrounding rectangle. The position of the tooth in the mouth can be represented for example by an FDI-number, e.g. number in the range from 11 to 48, or a number in the range from 11 to 85 (if baby teeth also considered). Finally, if two additional numbers, for example H (height) and W (width) are added, or W (width) and P (proportion=W/H), it can be seen that the central incisors can be represented by a limited set of only 13 numerical values.

In fact, for the central incisors, one additional parameter may be added, to indicate whether the tooth is rather "square", or "triangular" or "circular", resulting in a limited set of only 14 parameters.

These 14 parameters may be determined fully automatically using image processing techniques. It is pointed out that a computer implemented method for automatic detection of these characteristic points is not a "mere automation", but has to be recognized as a technical solution to a technical problem of how to efficiently describe the shape and size of a tooth in its clinical environment, because the technique described above is not known in the art.

In an alternative embodiment, the surrounding rectangle is replaced by a virtual beam shaped object having planes tangential to the tooth (except for the upper plane which can for example be chosen as the highest visible point of the tooth, at an edge of the gingiva), and the points a1 to a10 may be defined with reference to the edges and/or corners and/or planes of this beam shape. Other alternatives are of course also possible.

FIGS. 5(c) and (d) show a second exemplary tooth an its characteristic points on a 2D image.

FIGS. 5(e) and (f) show a third exemplary tooth an its characteristic points on a 2D image.

FIG. 5 shows how central incisors can be characterised by means of a limited set of parameters, e.g. a limited set of less than 20 numerical values, or less than 15 numerical values, for example by means of only 14 numerical values. In a similar manner, also other teeth can be represented by a limited set of less than 15 numerical values. For example, the shape of lateral incisors may be characterised by 10 points (or parameters): including 2 points for papilla's, 3+2=5 points for defining one transition curve and one transition line, and 4 points for embrasures, but preferably one points is commonly used for a transition line and for an embrasure, hence 11−1=10 points in total;

and the shape of canines may be characterised by 7 points (or parameters), because only one transition line is visible from the front, hence 2 points for one transition line, 2 points for papilla's, and 3 points for embrasures (only 1 point for incisal edge), hence 2+2+3=7 points in total;

and the shape of premolars may be characterised by 6 points (or parameters), because only one transition line is visible from the front, hence 2 points for one transition line, 2 points for papilla's, and 3 points for embrasures, but preferably one points is commonly used for a transition line and the mesial embrasure point (the one towards the canine), hence 2+2+3−1=6 points in total.

But of course, the present invention is not limited these specific points or parameters, and other points or parameters may also be used.

It may seem that these numerical values are insufficient to actually produce a 3D physical object (e.g. implant) of a central incisor, but that is not required, because in preferred embodiments of the present invention, the database not only comprises a 2D image of the teeth, but also a 3D-model, and once a matching tooth is found based on the 2D-image, or rather, based on the limited set of characterizing points of that 2D-image, then the 3D-model can be used for actual production.

In other words, the limited set of parameters described above are sufficient to define a matching tooth for the specific (current or future) clinical environment, and thereby result in a good looking new smile of a patient. It is noted in this respect that the smile of a patient is primarily determined by the "frontal appearance" of the upper teeth.

Thus, in preferred embodiments of the present invention, not only a 2D-image or 2D-scan is made of healthy teeth stored in the database, but preferably also a 3D scan is made of healthy teeth, (each tooth may be separated from the 3D scan, and prepared by filling the interdental part), and stored in the digital database, along with a 2D image and along with the limited set of parameters, to give the best of both worlds:

the 2D image and the limited set of parameters allow to search the database in a very efficient way, and allows to show the patient a photo-realistic image of how the dental restoration will look like after dental treatment; and the 3D scan allows to actually produce a 3D object of the virtual tooth found in the library once the user has made a final selection.

Or stated in other words, the 2D image and the limited set of parameters can be used when defining the future teeth, while the 3D representation can be used thereafter to actually produce physical objects, e.g. veneers.

For completeness, it is noted that an intraoral 3D scan, and separated teeth from an intraoral 3D scan, and production of 3D objects based on such 3D scans are known in the art, and they can advantageously be used in combination with the techniques described above.

FIGS. 6(a) and (b) illustrate how a user (e.g. a dentist) can (and should) take into account papilla shrinkage when defining the characteristics of the future teeth, as part of a medical treatment which also involves cutting the gingiva. Reasons for cutting the gingiva are not relevant for the present invention, but if the gingiva will be cut, the papilla will shrink, and this should be taken into account in the design of the future teeth.

FIG. 6(a) shows the restorative space (as in FIG. 4h), where the user can shift the upper curve 41 to indicate how far the gingiva will be cut. The points b1 and b2 indicate the current papilla heights, but when planning to cut the gingiva, the points b1 and b2 need to be shifted upwards towards the positions b1' and b2'. This shift may be performed manually or automatically when shifting the upper curve 41. In order to provide a clinically realistic picture of how the patient will look like after the treatment, this papilla shrinkage has to be taken into account, and the future teeth should be defined already taking into account this shrinkage even before it has happened.

FIGS. 6(c) and (d) and (e) show examples of other modifications that may be defined by a user (e.g. the dentist or the patient), by merely shifting one or more of the characteristic points in the restorative space image. In the example of FIG. 6(d), the size of one of the embrasures is reduced (by shifting the point b9 downwards). In the example of FIG. 6(e) the shape of the lateral incisor is adjusted by shifting the point b7 outwardly, thereby actually bending the distal transition curve.

FIG. 7(a) to (g) illustrate how, based upon a limited set of parameters, one or more or a limited number of matching teeth can automatically be found in a digital library of teeth.

FIG. 7(a) shows an example of a limited set of parameters that specify a shape and size of an envisioned or future tooth (in the example a central incisor). As explained above, the limited set of parameters may for example comprise (6 to 10)+3=9 to 13 numerical values (e.g. 6 to 10 percentage values corresponding to positions of characteristic points on a normalized rectangle or beam shape+an FDI number+a width W [e.g. in mm]+a proportion value (e.g. proportion=W/H=75%). For ease of the description, in most drawings, only a rectangle with the 10 points is shown.

The limited set of parameters or the points of FIG. 7(a) can be seen as "input" for a computer program that has to find a limited number of "matching teeth" in a digital database. In fact, for cases where the user (e.g. dentist) does not want or does not need to change the points, but only wants to find and/or produce a "new tooth" or a "new veneer" having the same size and shape as the existing tooth (e.g. because the existing tooth is broken), the picture or subpicture or scan could be submitted to the computer program as well, and the computer program could determine the position of the points automatically.

Figure 7:
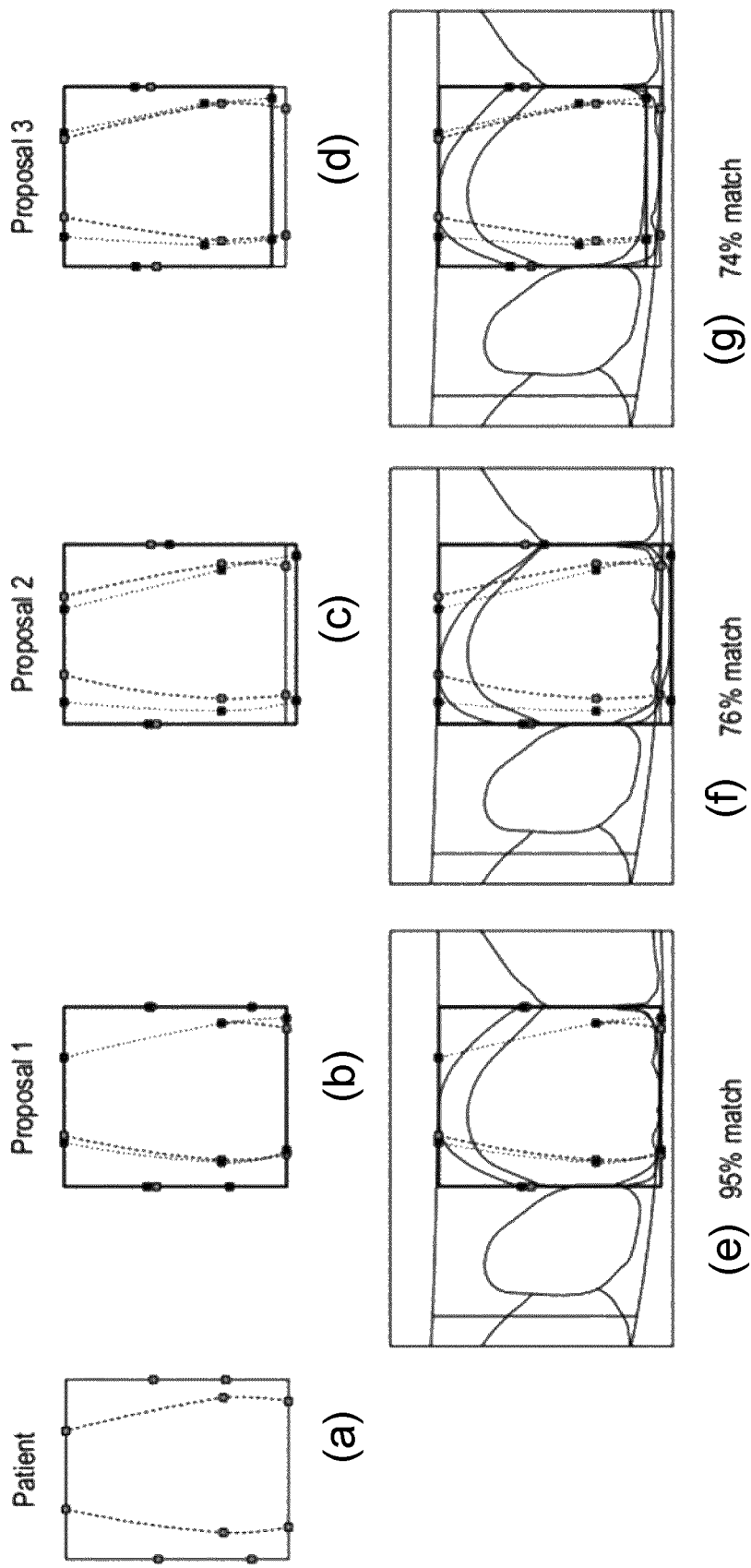
FIG. 7(a) to (g) illustrate how in embodiments of the present invention, and based upon an image or scan of an existing tooth in its environment (e.g. in the oral cavity), automatically a limited number of matching teeth can be found in a digital library of teeth.

The computer program would then search in the digital database for a limited number (e.g. only one, or only 2, or at most 3, or at most 5, or at most 7) matching teeth, based on the limited set of parameters (e.g. the characteristic values). In the example of FIG. 7, the computer program finds three matching teeth, the characteristic points of which are shown in FIG. 7(b) to FIG. 7(d). The computer program may present these candidate matching teeth (or a contour thereof) to the user, together with a matching score. FIG. 15 shows a possible user-interface for presenting the limited set of candidate matching teeth, but of course, the invention is not limited to this particular user interface. Normally, computer program would automatically preselect the tooth with the highest matching score, but in embodiments of the present invention the computer program may allow the user to select one of the other candidate teeth (see e.g. optional steps 1405 and 1407 of the method of FIG. 14).

It can be appreciated from FIG. 7(b) to FIG. 7(d) that it is difficult for a human user to decide which of the candidate teeth looks best on the particular person solely based on the position of the points and transition lines or transition curves. Thereto, the computer program preferably shows a contour of the preselected or selected future tooth over the restorative space representation (e.g. as shown in FIG. 4e or FIG. 4h), optionally also with the target or envisioned characteristic points, and optionally also with the characteristic points of the selected candidate tooth, and preferably also with the matching score.

FIG. 7(e) shows a portion of the restorative space in case the candidate future tooth of FIG. 7(b) is selected. FIG. 7(f) shows a portion of the restorative space in case the candidate future tooth of FIG. 7(c) is selected, and FIG. 7(g) shows a portion of the restorative space in case the candidate future tooth of FIG. 7(d) is selected. Typically only one of FIG. 7(e) to FIG. 7(g) would be shown to the user at any moment in time, for example in the manner as shown in FIG. 15(a) to FIG. 15(d), depending on which candidate tooth is selected.

It is noted that in practice a matching score of 74% is not a good match, but these candidate teeth are shown to illustrate how the characteristics of the envisioned (e.g. desired) future tooth may deviate from the characteristics of the candidate matching tooth selected from the database.

While not explicitly shown in FIG. 7, the computer program may be implemented in such a way that the user is allowed to modify the envisioned characteristic points (see e.g. step 1403 and step 1408 of FIG. 14), and in response, the computer program will search the database (see step 1404 of FIG. 14) and present another limited set of best matching teeth from the database. In a prototype of the program, this occurs almost instantaneously, thanks to the highly efficient manner of characterizing the tooth, and the ability to search the database for a matching tooth based on these characteristics.

Also, while not shown in FIG. 7, but see for example FIG. 4(g) and FIG. 4(h), or FIG. 17(b) and FIG. 17(c), the computer program may also show a photo-realistic image of the patient with the newly envisioned teeth. In this way, the patient gets an impression of what he or she will look like after dental treatment with this or with these selected and/or modified (e.g. scaled) teeth from the database.

To appreciate the power or the benefit of such a rendering, reference is made to the example of FIG. 15(a) and FIG. 15(b), where the patient can clearly see the current clinical situation before dental treatment (in FIG. 15a) and the future look after dental treatment (in FIG. 15b). If the patient is not happy with the result, he or she can further modify the characteristics of the future teeth, or can cancel the treatment. It is a major advantage of embodiments of the present invention that the patient can see a clinically realistic picture of how he or she will look like after dental treatment, especially in case the gingiva is cut.

FIG. 7 illustrates the situation for a central incisor, but of course, the same principles can also be used for other teeth, in particular the lateral incisors, and the canines, and even the first and second premolars. The smile of a person is primarily determined by these teeth, in that order of importance.

FIG. 8(a) to (i) illustrates another example similar to FIG. 7. In this example, the future teeth should be longer than the existing teeth, but the "shape" of the teeth should remain unchanged.

This can simply be done by shifting the lower curve 42 slightly downwards in FIG. 8(a), where it can be seen that the curve 42 is at a distance from the bottom of the teeth.

As mentioned above, the computer program automatically determines the FDI-number (based on the location on the grid) and the characteristic points shown in FIG. 8(c) by analysing a digital representation of the oral space (e.g. based on a frontal 2D picture), for example using edge detection techniques.

Based on this input, the computer program can then search the database, and will provide a limited set of candidate matching teeth. (in the example: only three candidates). The candidate tooth which the highest matching score is automatically preselected, in this example: proposal 3 of FIG. 8(f). FIG. 8(i) shows a portion of the restorative space, and optionally the positions of the characteristic points of the existing tooth, and preferably also a contour and also the positions of the characteristic points of the candidate future tooth, along with the matching score (in this case 96%).

Figure 8:
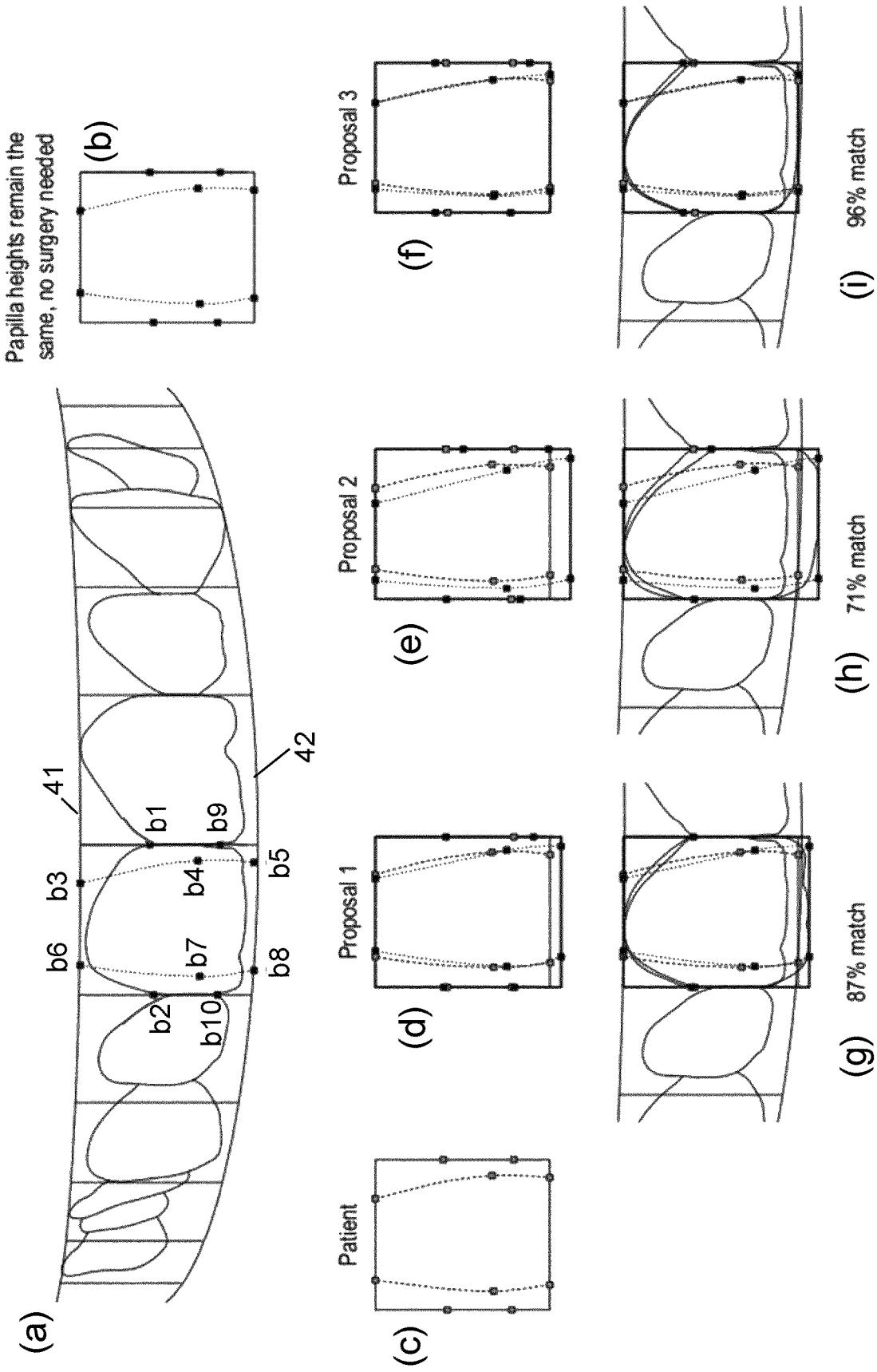
FIG. 8(a) to (i) illustrates an example how in embodiments of the present invention, and based upon an image or scan of one or more existing teeth, a new set of longer teeth can be easily and rapidly be defined, and how a limited number of matching teeth can be found in a digital library of teeth.

While not shown in FIG. 8, a photo-realistic picture of the patient with the future tooth is preferably also shown, e.g. as in FIG. 16(b) or in FIG. 17(b).

Figure 9A:
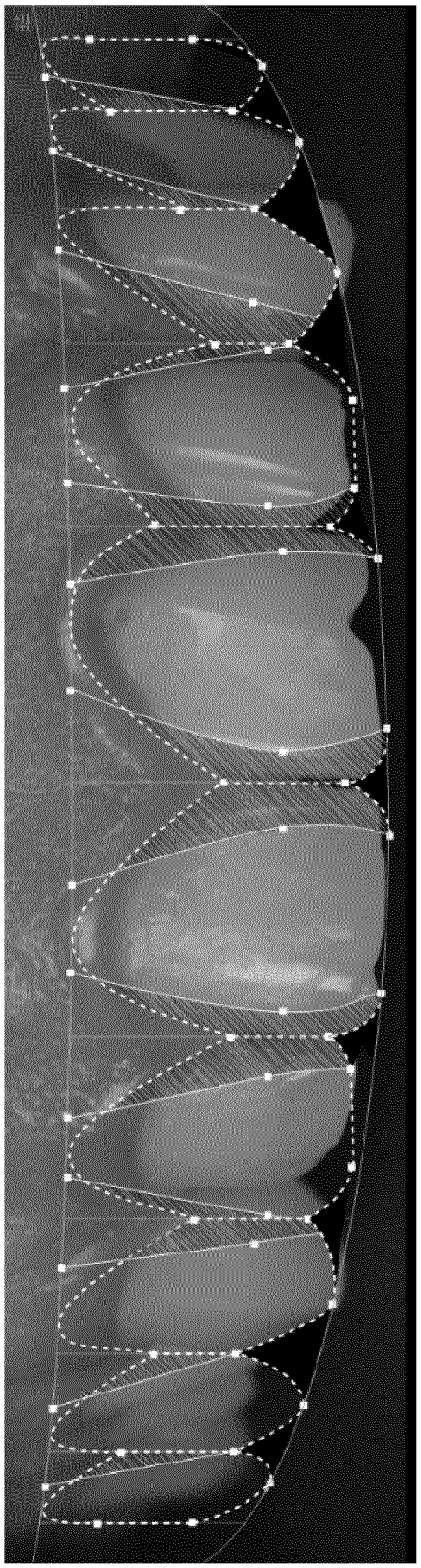
FIGS. 9(a) and (b) illustrate that a dental restoration based on a limited set of characteristic points can be defined not only for the frontal incisors but also for other teeth, e.g. the lateral incisors and/or the canines and/or the first premolars and/or the second premolars.
Figure 9B:
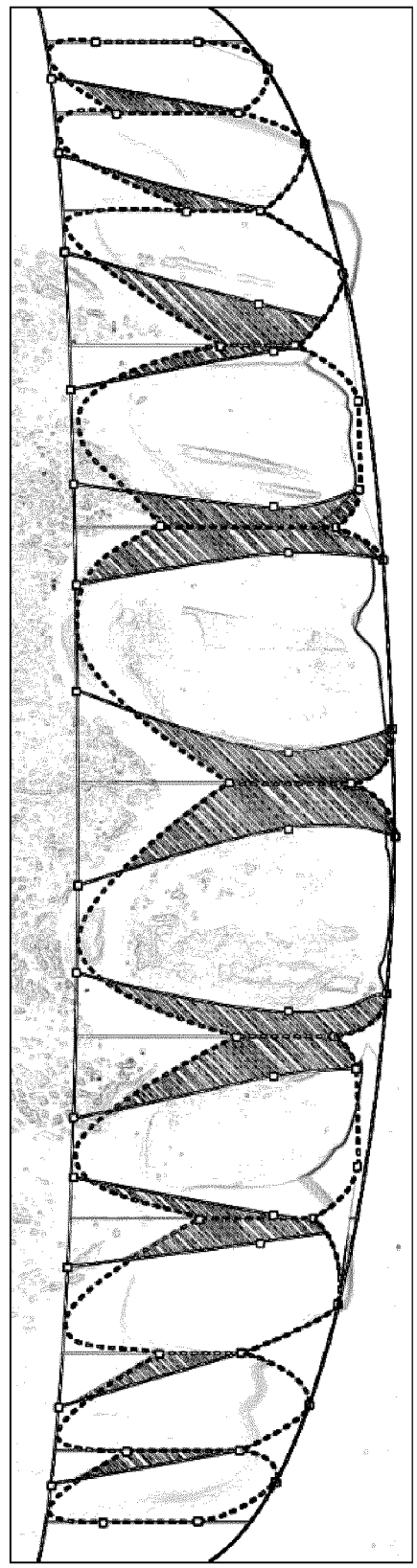

FIGS. 9(a) and (b) illustrate that a limited set of characteristic points can be defined not only for the frontal incisors but also for other teeth, e.g. for the lateral incisors and/or for the canines and/or for the first premolars and/or for the second premolars. FIG. 9(a) shows a grayscale image, FIG. 9(b) shows a line drawing, for illustrative purposes.

It is noted in this respect that the present invention is mainly concerned with dental restorations related to a beautiful smile, and hence the physical dimensions (e.g. the width), and the shape of the external surface of the teeth are of prime importance. It is noted in this respect that for example veneers typically need to be grinded or polished before they can be adhered to existing teeth.

While not worked out in detail, the principles of the present invention could also be extended to characterise the 3D shape of teeth, including the position and size and shape of protrusions and cavities in the premolars or molars. This can be accomplished by adding more characteristic points to the teeth to quantify said positions and sizes and shapes. And these characteristic points or values can then be added to a 3D-database to make the database searchable, etc.

Figure 10:
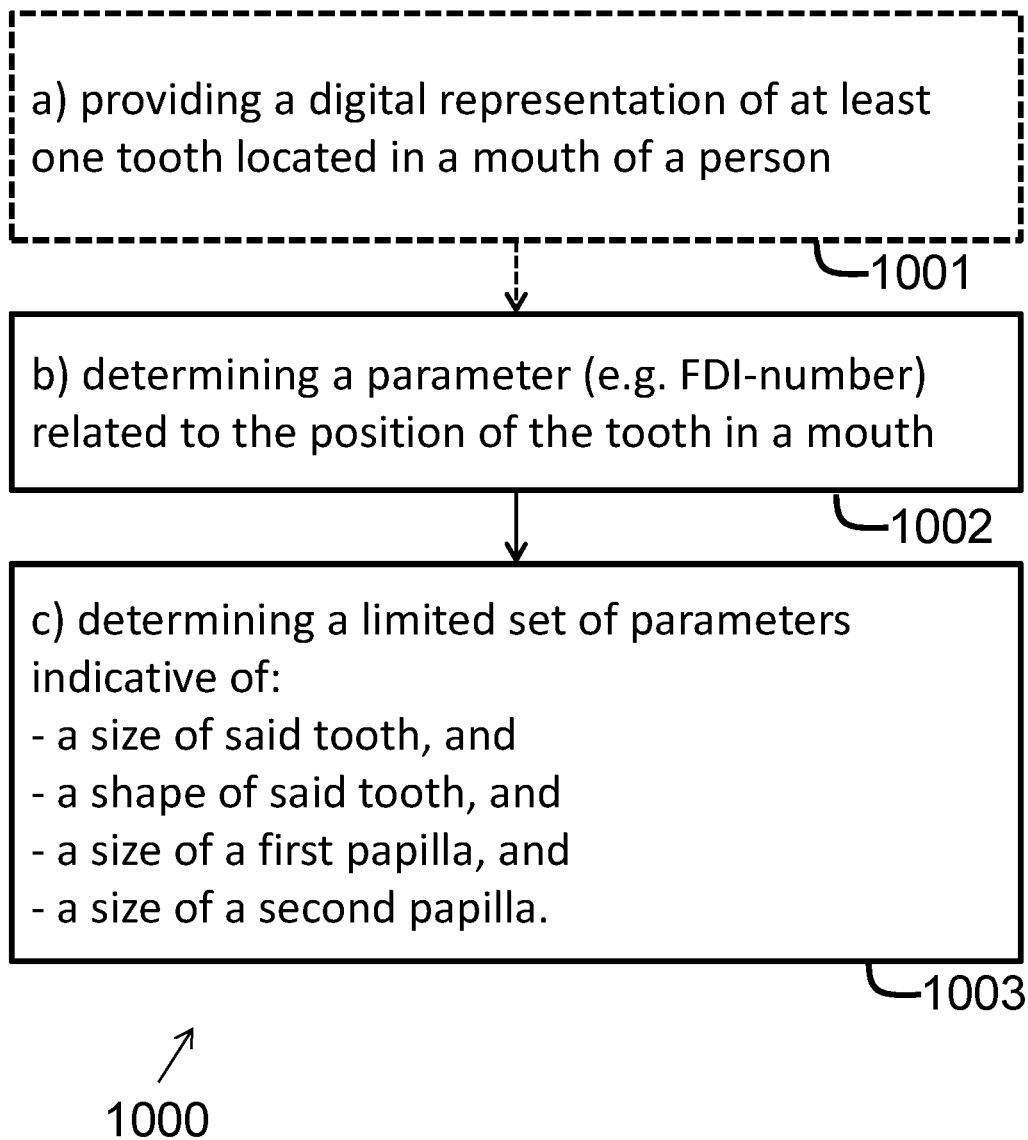
FIG. 10 is a flow chart of an exemplary computer implemented method of characterizing a tooth in an intraoral space, according to an embodiment of the present invention.

FIG. 10 is a flow chart of an exemplary computer implemented method 1000 of characterizing a tooth in an intraoral space. The method 1000 comprises at least the following steps:
b) determining 1002 a parameter, e.g. an FDI-number to uniquely define the position of the tooth in the mouth;
c) determining 1003 a limited set of parameters, for example less than 20 or less than 15 parameters, indicative of: a size of the tooth; and a shape of said tooth; and a size of a first papilla (e.g. the papilla located on the left of the tooth), and a size of a second papilla (e.g. the papilla located on the right of the tooth).

The parameters may comprise for example numerical values, and/or coordinates in a 2D picture, and/or coordinates in a 3D scan, and/or normalized values or percentages (with reference to a normalized rectangle or beam), etc.

Optionally, the method 1000 may also comprise step a) of providing 1001 a digital representation (e.g. a 2D picture and/or a 2D scan or a 3D scan) of at least one tooth located in a mouth of a person. This step may comprise for example: capturing a picture of a person using a digital camera, or using a web-cam, or using a facial scan, or using a 3D intraoral scan, or using a movie-camera; or receiving or retrieving such a picture or image or scan from a network or from an external device, or loading such a picture or image or scan from a storage medium (e.g. a memory stick or a hard disk) or from a network drive, or from the cloud.

As can be understood from the above, these parameters are strategically chosen so as to be able to represent (or at least approach) the size and shape of the tooth and the adjacent papilla's in a highly compact manner.

Step b) may further comprise: determining at least one parameter (e.g. a9 in FIG. 5a) for describing a first embrasure (e.g. adjacent a left side of the tooth); and determining at least one parameter (e.g. a10 in FIG. 5b) for describing a second embrasure (e.g. adjacent a right side of the tooth).

It was found that by taking the papilla heights into account, a more beautiful result was obtained, or expressed in technical terms: that a gap or opening under the papilla can be avoided.

The at least one parameter for describing a shape of the tooth may comprise exactly two parameters (e.g. a3 and a4, or a3 and a5, see FIG. 5) for describing a first transition line, and exactly two parameters (e.g. a6 and a7, or a6 and a8) for describing a second transition line. Experiments have shown that two pairs of only two parameters are sufficient to describe (or at least approach) the 3D shape of some of the teeth, in particular the canines, the first premolars and the second premolars, or at least a visible surface thereof.

Alternatively, the at least one parameter for describing a shape of the tooth may comprise exactly three parameters (e.g. a3, a4, a5) for describing a first transition curve, and exactly three parameters (e.g. a6, a7, a8) for describing a second transition curve. Experiments have shown that two pairs of only three parameters are sufficient to describe the 3D shape of some of the teeth, in particular the central and lateral incisors.

It is rather surprising that the 3D shape and the corresponding visual appearance of the teeth, can be described by only four or only six parameters, but these parameters allow to search in the database for digital teeth that "look the same or very similar" in a smile.

FIG. 11 is a flow chart of an exemplary computer implemented method 1100 for building a digital database or a digital library of teeth, in particular a library of natural teeth. The inventors realized that by including only healthy, beautiful natural teeth in the library, it is much easier to create a beautiful smile.

The computer implemented method 1100 of building a digital library may comprise the following steps:
capturing or generating or providing 1101 at least one digital representation of said tooth in its clinical environment;
characterising 1102 said tooth in its clinical environment, for example using the steps b) and c) of FIG. 10, thereby obtaining a limited set of parameters;

optionally normalizing 1103 the digital representation, for example by rotating, and/or cropping, and/or scaling;

optionally performing colour correction 1104; It is noted that colour correction may also be performed when extracting the tooth from the database.

f) adding 1105 the at least one digital representation, and adding the limited set of parameters to said digital library, in a manner wherein the at least one digital representation is linked to the set of parameters.

In some embodiments of the present invention, at least a 3D scan is captured and stored in the database, and the characteristic points may be derived from the 3D representation itself, or from a 2D projection of said 3D scan.

In preferred embodiments of the present, both a 2D-picture or 2D scan is captured, as well as a 3D scan, which are both stored in the database, and the characteristic points can be derived from the 2D-picture or 2D-scan.

Figure 12:
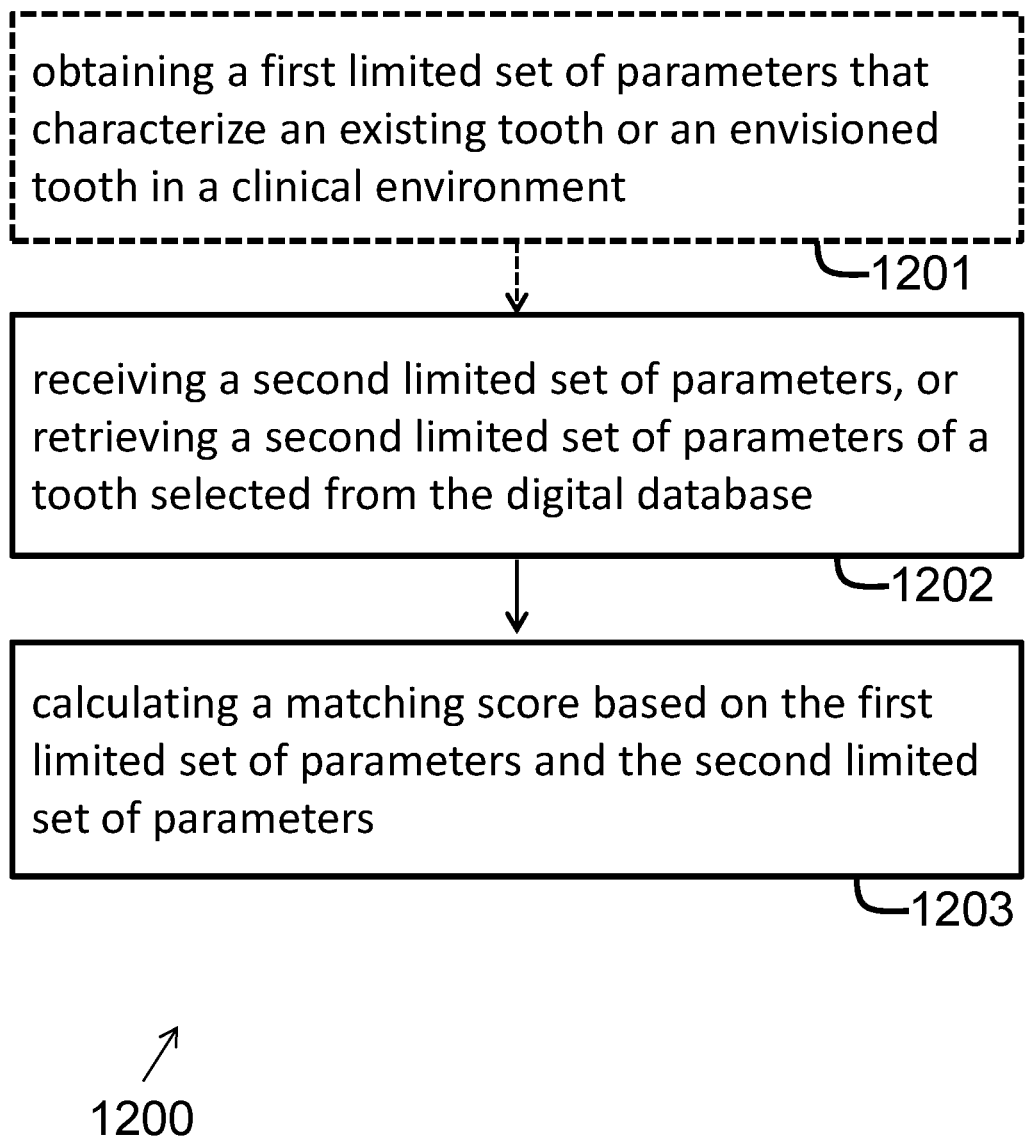
FIG. 12 shows a flow chart of a computer implemented method of determining or calculating a matching score between an existing tooth of a patient, and a virtual tooth from a digital database, according to an embodiment of the present invention.

FIG. 12 shows a flow chart of a computer implemented method 1200 of determining or calculating a matching score between an existing tooth in an intraoral space of a patient or of an envisioned tooth in said intraoral space of said patient (on the one hand), and a tooth selected from a digital database, e.g. a database as can be generated by the method shown in FIG. 11.

The method 1200 comprises the steps of:
obtaining 1201 a first limited set of parameters that characterize the existing tooth or the envisioned tooth, e.g. using the method of FIG. 10;
receiving a second set of parameters, or retrieving 1202 a second limited set of parameters of the tooth selected from the digital database;
calculating 1203 a matching score based on the first limited set of parameters and the second limited set of parameters.

It is an advantage of this method that the matching score is based on values related to visual aspects, rather than for example merely on volume of objects. While a volume is also a technical term, it is hardly related to aspects of visual appearance or beauty.

In an embodiment, the matching score may be calculated based on a sum or weighted sum of absolute values of differences between corresponding parameters related to size (e.g. Height or Width or proportion) and/or papilla height and/or shape. The matching core may for example be calculated as 100% minus said sum. Preferably the matching score is set to zero ("no match") if the "tooth number" (e.g. FDI number) is different.

In an embodiment, the matching score may be calculated based on a sum or weighted sum of square values of differences between corresponding parameters related to size (e.g. Height or Width or proportion) and/or papilla height and/or shape. The matching core may for example be calculated as 100% minus said sum. Preferably the matching score is set to zero ("no match") if the "tooth number" (e.g. FDI number) is different.

It is an advantage of using such matching score that it is computationally very simple, yet achieves excellent results.

The weight factors may be predefined constants, for example chosen such that:

i) the weight factor of the term related to difference in size (e.g. height and/or width and/or proportion) may be larger than or smaller than or equal to the weight factor of the term related to difference of papilla heights; and/or ii) the weight factor of the term related to difference of embrasures may be smaller than the weight factors related to difference in shape; and/or iii) the weight factor of the term related to difference in shape may be smaller then both the weight factor related to size and the weight factor related to difference of papilla height, and preferably all of the above.

In a specific embodiment, the weight factor related to difference in size or proportion is equal to about 40%, and the weight factor related to difference of papilla height is equal to about 30%, and the weight factor related to difference in shape (e.g. transition curves) is equal to about 20%, and the weight related to difference of embrasures is equal to about 10%.

In another specific embodiment, the weight factor related to difference in size or proportion is equal to about 30%, and the weight factor related to difference of papilla height is equal to about 40%, and the weight factor related to difference in shape (e.g. transition curves) is equal to about 20%, and the weight related to difference of embrasures is equal to about 10%.

But of course the present invention is not limited to these particular examples.

Figure 13:
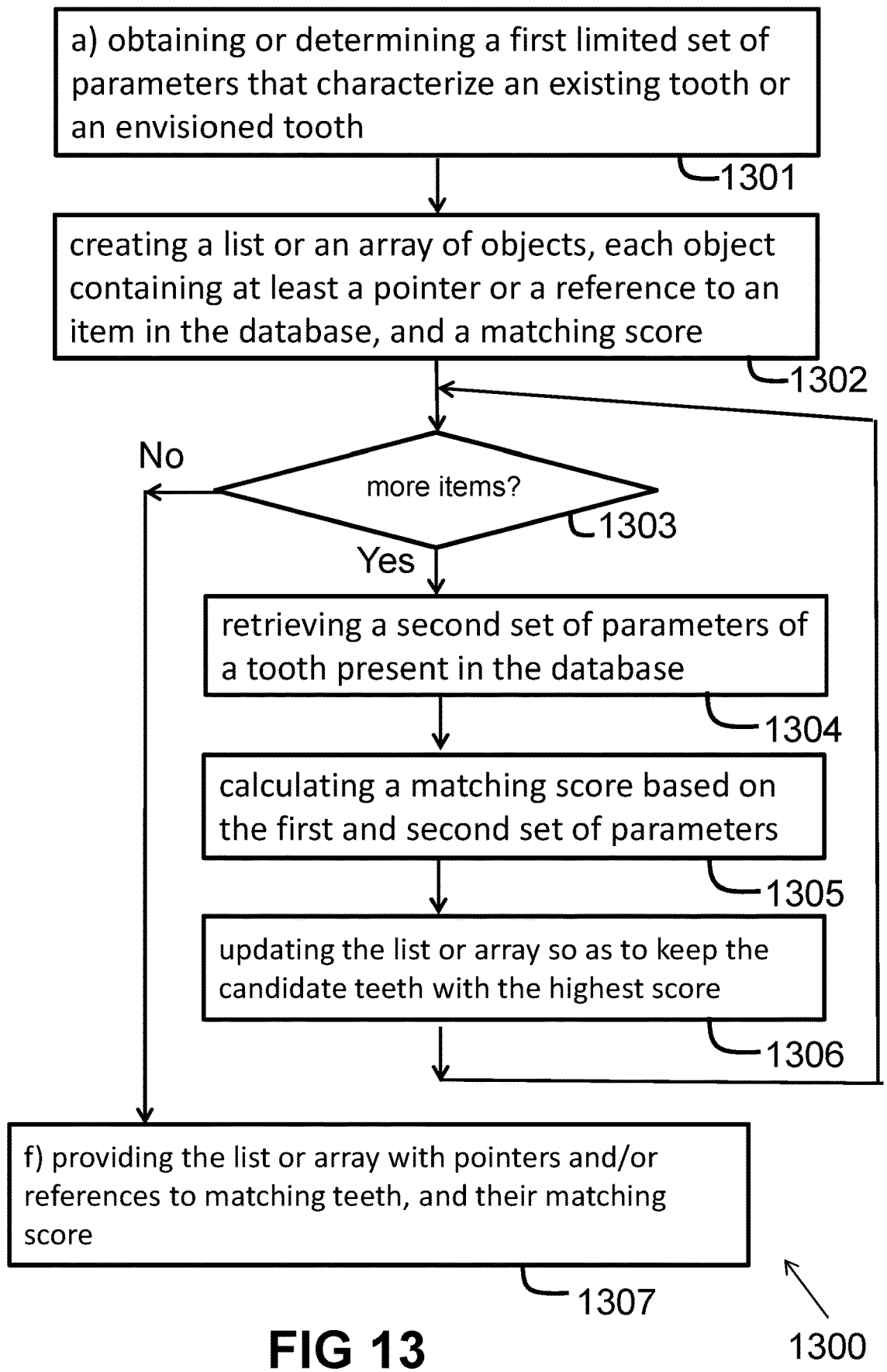
FIG. 13 shows a flow chart of a computer implemented method of searching in a digital database of teeth and selecting a limited set of candidate teeth with the best matching scores, according to an embodiment of the present invention.

FIG. 13 shows a flow chart of a computer implemented method 1300 of searching in a digital database of teeth for a limited number (e.g. at most ten, or at most seven, or at most five, or at most three, or only two, or only one) matching teeth. The method comprises the steps of:

a) obtaining or determining 1301 a first limited set of parameters that characterize the existing tooth or the envisioned tooth, e.g. using the method of FIG. 10;

b) creating 1302 a list or an array of objects, each object containing at least a pointer or a reference to items of the database, and a matching score; (and e.g. initialising the list or array);

For at least a subset of the digital teeth stored in the digital library, performing the steps:

c) retrieving 1304 a second limited set of parameters of a tooth present in the digital database;

d) calculating 1305 a matching score based on the first limited set of parameters and the second limited set of parameters;

e) updating 1306 said list or array so as to keep pointers to the candidate teeth having the highest score;

f) providing 1307 the list or array with pointers and/or a references to matching teeth, and their matching score.

It is a major advantage of the limited set of parameters that the database can be searched, and that matching teeth can be found, moreover in a fast and highly efficient manner. This dramatically reduces the time required for planning a dental treatment, e.g. for what is known in the art as "designing a new smile".

Figure 14:
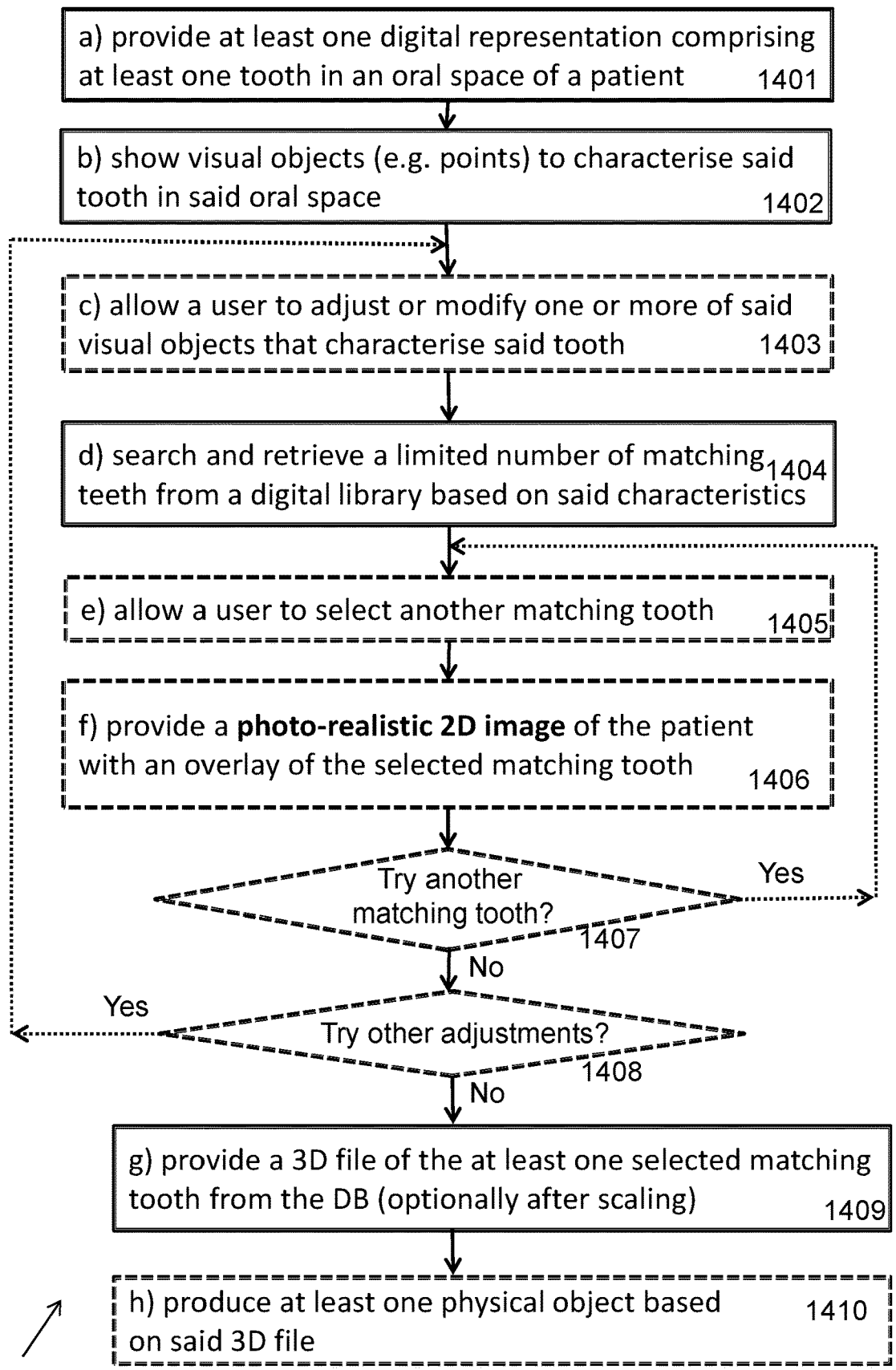
FIG. 14 is a flow chart of a computer implemented method for providing a 3D file for producing a dental restoration automatically or semi-automatically, according to an embodiment of the present invention. Or stated in other words, a computer implemented method for allowing a user to design or define or plan a dental restoration.
Figure 15:
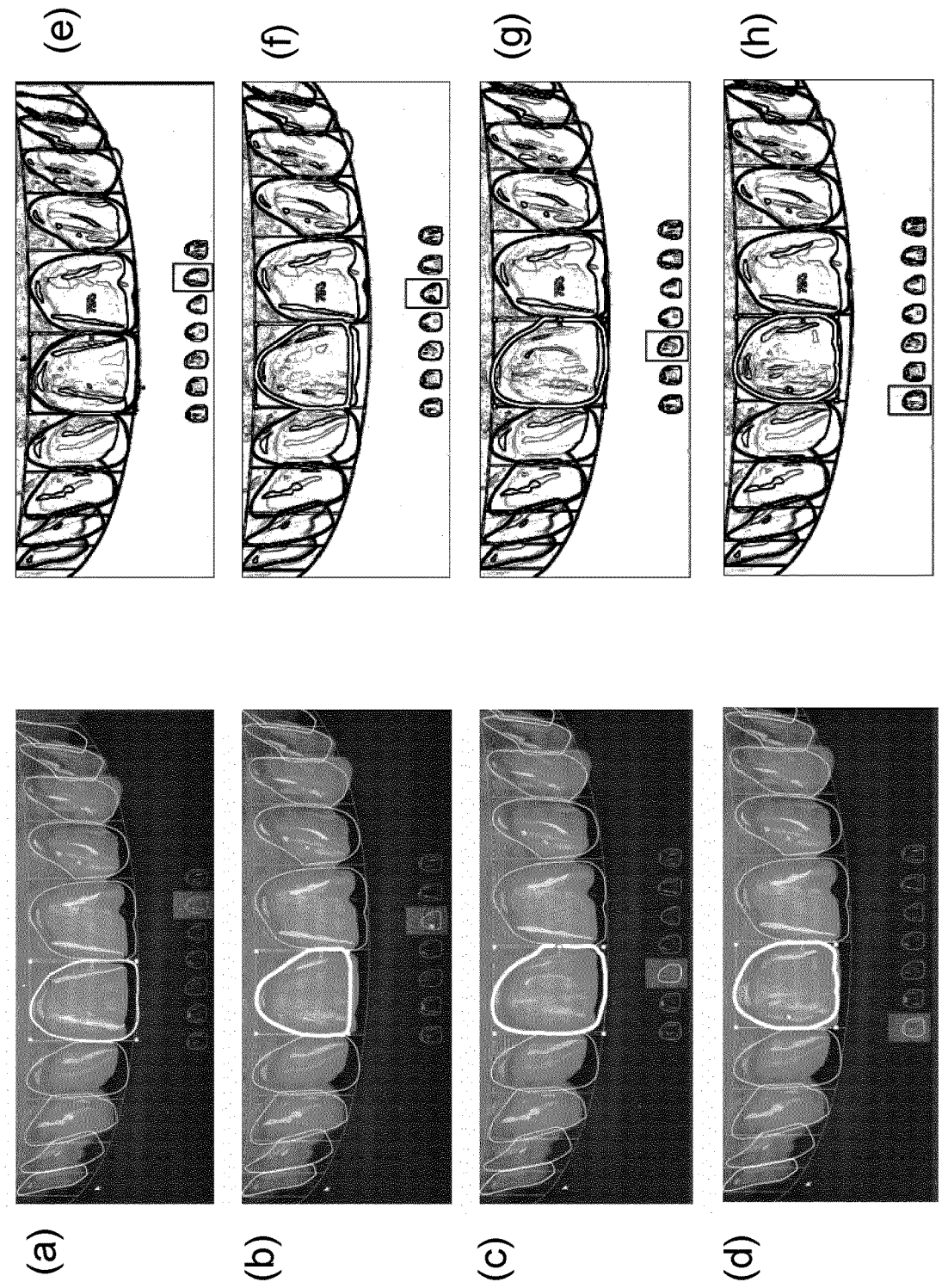
FIG. 15(a) to (h) show exemplary screenshots of a computer program product adapted for performing one or more steps of the computer implemented method shown in FIG. 14, inter alia allowing a user to specify target parameters (of envisioned teeth), for automatically searching the database for matching teeth, for presenting the user with a limited set of candidate matching teeth, and for allowing the user to select another tooth from the limited set of candidate matching teeth.

FIG. 14 shows a flow chart of a computer implemented method 1400 for providing a 3D file for producing a dental restoration automatically or semi-automatically. Or stated in other words, a computer implemented method for allowing a user to design or define or plan a dental restoration. The method comprises the steps of:

a) providing 1401 at least one digital representation of at least one tooth in an oral space of a patient, for example providing one or more picture(s) and/or scan(s), for example a 2D frontal picture, and/or a 3D facial scan, and/or a 3D intraoral scan, etc.;

b) showing 1402 a plurality of visual objects (e.g. a grid and/or points) to characterise said at least one tooth in said oral space;

c) optionally allowing 1403 a user to repeatedly 1408 adjust and/or modify one or more of said visual objects that characterise said tooth;

d) searching and retrieving 1404 a limited number of candidate matching teeth from a digital library of teeth, based on said characteristics, for example using the method illustrated in FIG. 13;

e) optionally allowing 1405, 1407 a user to repeatedly select another matching tooth from the limited set of candidate matching teeth;

f) optionally providing 1406 a photo-realistic 2D image of the patient with an overlay of the selected matching tooth, optionally after scaling;

g) providing 1409 a 3D-file of the at least one selected matching tooth, optionally after scaling.

This method is directed to a computer implemented method that for example starts from a 2D-picture (e.g. as in FIG. 4a), shows a grid and/or characteristic points (e.g. as shown in FIG. 5 to FIG. 8), allows a user to modify the characteristic points to thereby specify how the future teeth should look like, provides the user with a limited number of (good) matching results from the database as the user modifies some characteristic points (e.g. as shown in FIG. 8), and finally provides a 3D-file allowing the envisioned tooth to be manufactured.

The method may further comprise step h) of producing at least one physical object based on said 3D file, for example by rapid manufacturing techniques, such as e.g. by 3D-printing.

The end result of this method is a physical object.

FIG. 15(a) to (d) show screenshots of an exemplary user interface of a computer implemented method adapted for performing one or more steps of the method shown in FIG. 14, in particular step b) to e). In this example, the computer program searches the database, and retrieves the seven best matching candidates, and shows a miniature picture or a miniaturized contour of the candidate matching teeth, preferably each with a matching score, from which the user (e.g. the dentist) can select one, a contour of which is subsequently rendered in the picture representing the restoratory space.

FIG. 15(e) to FIG. 15(h) are line drawings of FIG. 15(a) to FIG. 15(d) for illustrative purposes.

While not explicitly shown in FIG. 15, preferably also a photorealistic image of the patient is provided with a color picture of the one or more tooth selected from the database (not only the contour), an example of which is shown in FIG. 16(b). This photorealistic 2D-picture is preferably provided on the same screen or on the same display as the picture showing the restoratory space, for example side by side as shown for example in FIG. 17 (b) and FIG. 17(c).

FIG. 16(a) shows a 2D picture or a 3D facial scan of a patient before dental treatment, and FIG. 16(b) shows a clinical realistic and photo-realistic 2D picture of how that patient will look like after dental treatment, for example after the selected teeth or veneers or the like are produced, and bonded to the existing teeth.

FIG. 16(c) and FIG. 16(d) are line drawings for FIGS. 16(a) and (b) for illustrative purposes.

FIG. 17(a) and FIG. 17(c) show a 2D picture of the teeth shown in FIG. 2(a), overlaid with a grid, as described above.

FIG. 17(a) shows the restoratory space based on a frontal 2D picture of the patient, with the addition of a grid (as described in FIG. 4). Characteristic points for each tooth are automatically determined by the computer program, and shown to the user. The user can optionally modify the position of one or more of these points.

FIG. 17(c) shows the restoratory picture with multiple contours of best matching teeth for each particular location. The best matching teeth retrieved from the library may come from different people. What is shown is the automatic proposal (or preselection of teeth) made by the computer program product for each of the ten teeth. The user can simply accept this proposal, or can select a different matching tooth for one or more of the teeth individually, as described above.

FIG. 17(b) shows a photo-realistic picture of how the patient will look like after dental treatment. As can be appreciated, using methods according to the present invention, the poor clinical situation illustrated in FIG. 2, can be converted into the beautiful smile shown in FIG. 3 and FIG. 17(b).

FIG. 18(a) to (c) are line drawings for FIG. 17(a) to (c), provided for illustrative purposes.

While individual features are explained in different drawings and different embodiments of the present invention, it is contemplated that features of different embodiments can be combined, as would be obvious to the skilled person, when reading this document.

The invention claimed is:

1. A computer implemented method of building a digital library of teeth, the method comprising:
   (a) capturing or generating or providing at least one digital representation of said tooth in its clinical environment;
   (b) characterizing, by the computer, said tooth in its clinical environment by utilizing a limited set of parameters, wherein characterizing said tooth in its clinical environment comprises:
       determining a position parameter indicative for a unique position of the tooth in a mouth; and
       determining at least two parameters for describing a size of said tooth; and
       determining at least one parameter for describing a first papilla height; and
       determining at least one parameter for describing a second papilla height; and
       determining at least two parameters for describing a shape or a perceived shape of the tooth; and
   (c) adding the at least one digital representation and adding the limited set of parameters to said digital library leading to the digital library to be searchable in a fast and efficient manner.

2. The method of claim 1, wherein (b) comprises characterizing said tooth in its clinical environment by utilizing at least 6 parameters and at most 20 parameters.

3. The method of claim 1, wherein the at least two parameters for describing the shape or perceived shape of the tooth comprise one or more of the following:
   at least two parameters for describing a single transition line;
   at least three parameters for describing one transition curve;
   at least four parameters for describing two transition lines;
   at least five parameters for describing one transition line and one transition curve; and
   at least six parameters for describing two transition curves.

4. The method of claim 1, wherein (a) comprises capturing or generating a 2D frontal picture or a 3D facial scan comprising an image of said tooth and at least a portion of a gingiva above said tooth, and a portion of a left neighbouring papilla, and a portion of a right neighbouring papilla.

5. The method of claim 1, wherein (b) further comprises:
   determining at least one parameter for describing a first embrasure; and determining at least one parameter for describing a second embrasure.

6. A computer implemented method of searching, by a computer, in a digital database of teeth, and of automatically retrieving from the database by the computer, a limited set of candidate teeth that matches a digital representation of a particular tooth in its clinical environment, the method comprising:
(a) obtaining or determining a first limited set of parameters that characterize the existing tooth or the envisioned tooth, wherein the first limited set of parameters are chosen such that they allow for calculating a matching score in a fast and efficient manner;
(b) creating a list or an array of objects, each object containing at least a pointer or a reference to items of the database, and a matching score;
for at least a subset of the digital teeth stored in the digital library, performing:
(c) retrieving, by the computer, a second limited set of parameters of the tooth selected from the digital database;
(d) determining, by the computer, a matching score based on the first limited set of parameters and the second limited set of parameters by quantitatively comparing the determined first limited set of parameters that characterize the existing tooth or the envisioned tooth with the retrieved second limited set of parameters of the tooth selected from the digital database to determine a degree of similarity between the existing tooth or the envisioned tooth and the tooth selected from the digital database; and
(e) updating said list or array so as to keep pointers or references to the candidate teeth having a highest score; and
(f) providing the list or array with pointers or a references to matching teeth, and their matching score leading to a reduction in time required for planning a dental treatment.

7. The method of claim 6, wherein (a) comprises characterizing said tooth in its clinical environment by utilizing at least 6 parameters and at most 20 parameters.

8. The method of claim 6, wherein (a) comprises:
determining a position parameter indicative for a unique position of the tooth in a mouth; and
determining at least two parameters for describing a size of said tooth; and
determining at least one parameter for describing a first papilla height; and
determining at least one parameter for describing a second papilla height; and
determining at least two parameters for describing a shape or a perceived shape of the tooth.

9. The method of claim 8, wherein the at least two parameters for describing the shape or perceived shape of the tooth comprise one or more of the following:
at least two parameters for describing a single transition line;
at least three parameters for describing one transition curve;
at least four parameters for describing two transition lines;
at least five parameters for describing one transition line and one transition curve; and
at least six parameters for describing two transition curves.

10. The method of claim 6, wherein (d) comprises calculating the matching score based on differences or deviations between corresponding parameters from the first limited set of parameters and the second limited set of parameters.

11. A computer implemented method of generating a dental design, the method comprising:
(a) providing at least one digital representation of at least one tooth in an oral space of a patient;
(b) showing a plurality of visual objects to characterise said at least one tooth in said oral space;
(c) determining a limited set of parameters corresponding to said visual objects;
(d) searching and retrieving a limited number of candidate matching teeth from a digital library of teeth based on said characteristics, using the method of claim 6; and
(e) providing a 3D-file of at least one selected matching tooth.

12. The method of claim 11, further comprising receiving input from a user to adjust or modify one or more of said visual objects.

13. The method of claim 11, further comprising receiving input from a user to select another matching tooth from the limited set of candidate matching teeth.

14. The method of claim 11, further comprising providing a photo-realistic 2D image of the patient with an overlay of the selected matching tooth.

15. The method of claim 11, further comprising producing at least one physical object based on said 3D file.

* * * * *